(12) United States Patent
Agarwal et al.

(10) Patent No.: US 11,138,071 B1
(45) Date of Patent: Oct. 5, 2021

(54) ON-CHIP PARITY BUFFER MANAGEMENT FOR STORAGE BLOCK COMBINING IN NON-VOLATILE MEMORY

(71) Applicant: Western Digital Technologies, Inc., San Jose, CA (US)

(72) Inventors: Dinesh Kumar Agarwal, Bangalore (IN); Amit Sharma, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/908,147

(22) Filed: Jun. 22, 2020

(51) Int. Cl.
*G06F 11/00* (2006.01)
*G06F 11/10* (2006.01)
*G06F 3/06* (2006.01)

(52) U.S. Cl.
CPC .......... *G06F 11/1068* (2013.01); *G06F 3/064* (2013.01); *G06F 3/0619* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,266,273 B1 | 7/2001 | Conley et al. | |
| 6,745,284 B1 * | 6/2004 | Lee .................. | G06F 3/0613 711/112 |
| 7,958,304 B1 * | 6/2011 | Goel ................. | G06F 11/1096 711/114 |
| 8,027,195 B2 | 9/2011 | Li et al. | |
| 8,144,512 B2 | 3/2012 | Huang et al. | |
| 8,458,566 B2 | 6/2013 | Peng et al. | |
| 8,914,703 B2 | 12/2014 | Tomlin | |
| 8,977,813 B2 | 3/2015 | Burd | |
| 9,043,668 B2 | 5/2015 | Goss et al. | |
| 9,124,300 B2 | 9/2015 | Sharon et al. | |
| 9,213,601 B2 | 12/2015 | Tuers et al. | |
| 10,042,553 B2 | 8/2018 | Parker et al. | |
| 10,496,472 B2 | 12/2019 | Gopalakrishnan | |
| 2002/0194526 A1 | 12/2002 | Ulrich et al. | |
| 2010/0211737 A1 * | 8/2010 | Flynn ................. | G06F 12/0246 711/114 |

(Continued)

OTHER PUBLICATIONS

A. S. Ramasamy and P. Karantharaj, "File system and storage array design challenges for flash memory," 2014 International Conference on Green Computing Communication and Electrical Engineering (ICGCCEE), 2014, pp. 1-8, doi: 10.1109/ICGCCEE .2014. 6922453. (Year: 2014).*

*Primary Examiner* — Daniel F. McMahon
(74) *Attorney, Agent, or Firm* — Patterson & Sheridan LLP; Steven H. Versteeg

(57) ABSTRACT

On-chip XOR parity data management combines storage blocks in non-volatile memory. Multiple source storage blocks are selected to be combined and stored into a destination storage block. Each source storage block includes a data section and a parity section. The parity section includes XOR parity data that enables data recovery of physical pages of the source storage block. The source storage blocks are merged into the destination storage block, which is configured to store multiple bits per memory cell. Parity sections of one or more of the plurality of source storage blocks remain unchanged after merging into the destination storage block.

20 Claims, 13 Drawing Sheets

(56) References Cited

U.S. PATENT DOCUMENTS

| | | |
|---|---|---|
| 2010/0309720 A1 | 12/2010 | Liu et al. |
| 2012/0233523 A1* | 9/2012 | Krishnamoorthy ... H03M 13/05 |
| | | 714/758 |
| 2013/0031429 A1 | 1/2013 | Sharon et al. |
| 2013/0268822 A1 | 10/2013 | Manoochehri et al. |
| 2013/0304970 A1 | 11/2013 | Parizi |
| 2014/0047296 A1* | 2/2014 | Motabar ............. G06F 11/1048 |
| | | 714/758 |
| 2014/0129874 A1* | 5/2014 | Zaltsman ............. G06F 11/108 |
| | | 714/6.11 |
| 2014/0157085 A1* | 6/2014 | Shalvi ................... G06F 3/0619 |
| | | 714/768 |
| 2016/0085464 A1 | 3/2016 | Tuers et al. |
| 2016/0188410 A1* | 6/2016 | Lee ..................... G06F 11/1044 |
| | | 714/6.24 |
| 2018/0024897 A1 | 1/2018 | Cai et al. |
| 2018/0267720 A1* | 9/2018 | Goldberg .............. G06F 3/0619 |
| 2018/0294823 A1 | 10/2018 | Li |
| 2018/0300081 A1 | 10/2018 | Parker et al. |
| 2018/0373431 A1 | 12/2018 | Kathawala et al. |

\* cited by examiner

| WL | String | Page | Die 0 PL0 | Die 0 PL1 | Die 1 PL0 | Die 1 PL1 | Die 2 PL0 | Die 2 PL1 | Die 3 PL0 | Die 3 PL1 |
|---|---|---|---|---|---|---|---|---|---|---|
| N-2 | 0 | (N-1)*16-16 | 0 | 16 | 4 | 20 | 8 | 24 | 12 | 28 |
| | | (N-1)*16-15 | 1 | 17 | 5 | 21 | 9 | 25 | 13 | 29 |
| | | (N-1)*16-14 | 2 | 18 | 6 | 22 | 10 | 26 | 14 | 30 |
| | | (N-1)*16-13 | 3 | 19 | 7 | 23 | 11 | 27 | 15 | 31 |
| | 1 | (N-1)*16-12 | 4 | 20 | 8 | 24 | 12 | 28 | 16 | 0 |
| | | (N-1)*16-11 | 5 | 21 | 9 | 25 | 13 | 29 | 17 | 1 |
| | | (N-1)*16-10 | 6 | 22 | 10 | 26 | 14 | 30 | 18 | 2 |
| | | (N-1)*16-9 | 7 | 23 | 11 | 27 | 15 | 31 | 19 | 3 |
| | 2 | (N-1)*16-8 | 8 | 24 | 12 | 28 | 16 | 0 | 20 | 4 |
| | | (N-1)*16-7 | 9 | 25 | 13 | 29 | 17 | 1 | 21 | 5 |
| | | (N-1)*16-6 | 10 | 26 | 14 | 30 | 18 | 2 | 22 | 6 |
| | | (N-1)*16-5 | 11 | 27 | 15 | 31 | 19 | 3 | 23 | 7 |
| | 3 | (N-1)*16-4 | 12 | 28 | 16 | 0 | 20 | 4 | 24 | 8 |
| | | (N-1)*16-3 | 13 | 29 | 17 | 1 | 21 | 5 | 25 | 9 |
| | | (N-1)*16-2 | 14 | 30 | 18 | 2 | 22 | 6 | 26 | 10 |
| | | (N-1)*16-1 | 15 | 31 | 19 | 3 | 23 | 7 | 27 | 11 |
| N-1 | 0 | N*16-16 | 16 | 0 | 20 | 4 | 24 | 8 | 28 | 12 |
| | | N*16-15 | 17 | 1 | 21 | 5 | 25 | 9 | 29 | 13 |
| | | N*16-14 | 18 | 2 | 22 | 6 | 26 | 10 | 30 | 14 |
| | | N*16-13 | 19 | 3 | 23 | 7 | 27 | 11 | 31 | 15 |
| | 1 | N*16-12 | 20 | 4 | 24 | 8 | 28 | 12 | 0 | 16 |
| | | N*16-11 | 21 | 5 | 25 | 9 | 29 | 13 | 1 | 17 |
| | | N*16-10 | 22 | 6 | 26 | 10 | 30 | 14 | 2 | 18 |
| | | N*16-9 | 23 | 7 | 27 | 11 | 31 | 15 | 3 | 19 |
| | 2 | N*16-8 | 24 | 8 | 28 | 12 | 0 | 16 | 4 | 20 |
| | | N*16-7 | 25 | 9 | 29 | 13 | 1 | 17 | 5 | 21 |
| | | N*16-6 | 26 | 10 | 30 | 14 | 2 | 18 | 6 | 22 |
| | | N*16-5 | 27 | 11 | 31 | 15 | 3 | 19 | 7 | 23 |
| | 3 | N*16-4 | 28 | 12 | 0 | 16 | 4 | 20 | 8 | 24 |
| | | N*16-3 | 29 | 13 | 1 | 17 | 5 | 21 | 9 | 25 |
| | | N*16-2 | 30 | 14 | 2 | 18 | 6 | 22 | 10 | 26 |
| | | N*16-1 | 31 | 15 | 3 | 19 | 7 | 23 | 11 | 27 |

500

Data Section 502

Parity Section 504

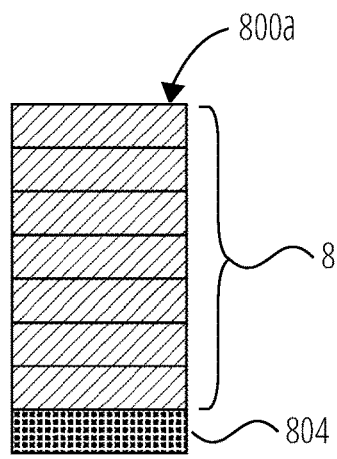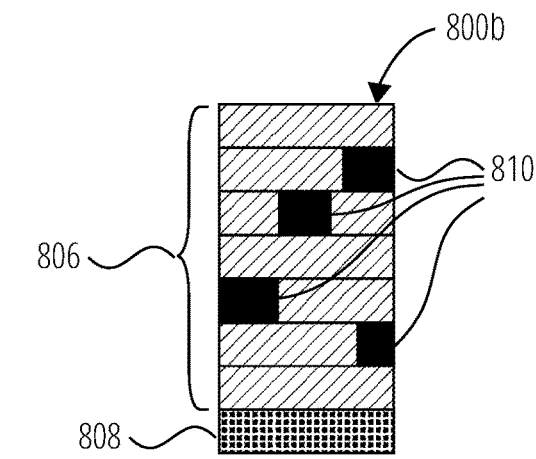
FIG. 8A  FIG. 8B
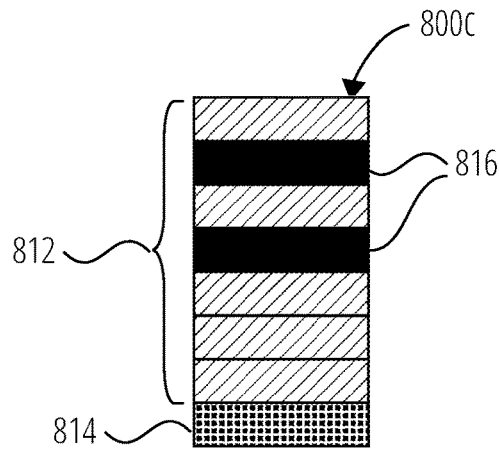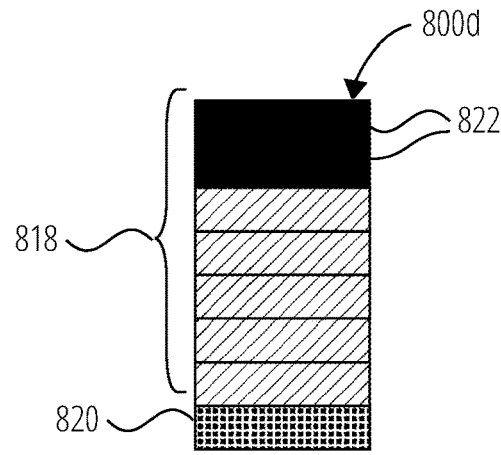
FIG. 8C  FIG. 8D
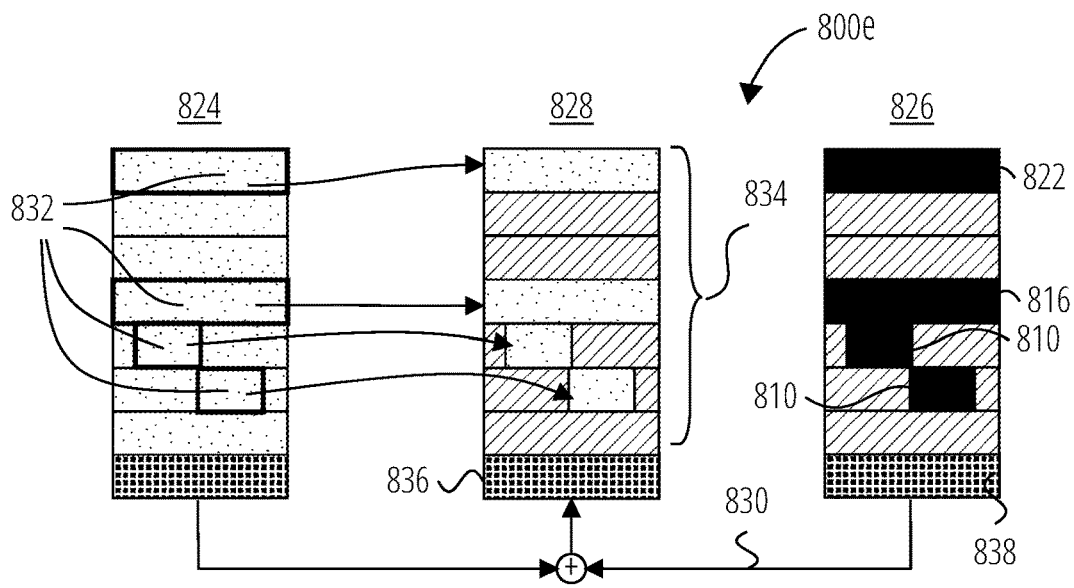
FIG. 8E

FIG. 11

ON-CHIP PARITY BUFFER MANAGEMENT FOR STORAGE BLOCK COMBINING IN NON-VOLATILE MEMORY

The present disclosure, in various embodiments, relates to non-volatile memory and more particularly relates to a combined parity buffer memory for multiple storage blocks of non-volatile memory. The amount of data accessed by host computers has been growing steadily. Accordingly, storage densities have increased to accommodate greater storage capacities. However, higher storage densities can increase data errors, making error correction very important.

Certain products include XOR parity data for recovering from certain types of errors. The XOR parity data may be stored in buffer memory (XOR buffer memory) and then preserved on a non-volatile storage media. Generating and managing XOR buffer memory and the data needed to keep up to date may consume a significant amount of area, time, and power, increasing costs and reducing efficiency.

SUMMARY

This disclosure relates to a method for on-chip parity buffer management for storage block combining in non-volatile memory. Multiple source storage blocks are selected to be combined into a destination storage block. Each source storage block comprises memory cells organized into a data section and a parity section. The parity section comprises XOR parity data that enables data recovery of physical pages of the source storage block. The source storage blocks are merged into the destination storage block, which is configured to store multiple bits per memory cell. Parity sections of one or more of the source storage blocks may remain unchanged after merging into the destination storage block.

This disclosure further relates to an apparatus for on-chip parity buffer management for combining storage blocks in non-volatile memory. The apparatus comprises a non-volatile memory array and a storage controller. The non-volatile memory array includes multiple memory die and multiple storage blocks. Each storage block comprises word lines organized into a string that comprises logical pages spanning the memory die. Each storage block may be configured to store one or more logical pages within each string. The storage controller comprises a consolidation manager configured to combine source storage blocks of the non-volatile memory array into a destination storage block of the non-volatile memory array such that more data of the source storage blocks is copied to the destination storage block by way of an on-chip copy (OCC) operation than data copied to the destination storage block by way of a copy-through-controller (CTC) operation.

Finally, this disclosure relates to an apparatus comprising a non-volatile memory array and a storage controller. The non-volatile memory array comprises a plurality of memory die and a plurality of storage blocks. The storage blocks comprise word lines organized into strings that comprise logical pages that span the memory die. Each storage block may be configured to store one or more logical pages within each string. The storage controller includes a consolidation manager. The consolidation manager includes a classifier configured to identify fragmented source storage blocks within a plurality of source storage blocks for combining into a destination storage block.

Each source storage block comprises memory cells organized into a data section and a parity section. The parity section comprises XOR parity data configured to enable data recovery of physical pages of a source storage block. The consolidation manager further includes a differentiator and a merger. The differentiator is configured to request differential data associated with the identified fragmented source storage blocks. The differentiator then transfers the differential data from the non-volatile memory array to the storage controller. The differential data comprises one or more of invalid data, fill data, and one or more invalid parity sections. The differentiator converts the one or more invalid parity sections into valid parity sections for whole source storage blocks configured to include the fill data. The whole source storage block replaces the fragmented source storage blocks within the plurality of source storage blocks. The differentiator then transfers the valid parity sections to the non-volatile memory array. The merger is configured to direct the plurality of memory die of the non-volatile memory array to merge the plurality of source storage blocks into the destination storage block.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 5 illustrates a QLC (Quad Level Cell) storage block parity bin map 500 in accordance with one embodiment.

FIG. 8A illustrates a complete source storage block 800a in accordance with one embodiment.

FIG. 8B illustrates a fragmented source storage block 800b in accordance with one embodiment.

FIG. 8C illustrates a source storage block having failed word lines 800c in accordance with one embodiment.

FIG. 8D illustrates a source storage block with known bad word lines 800d in accordance with one embodiment.

FIG. 8E illustrates a generation of a whole source storage block 800e in accordance with one embodiment.

FIG. 11 illustrates a QLC storage block with XOR parity bin protection 1100 in accordance with one embodiment.

DETAILED DESCRIPTION

Figure 1:
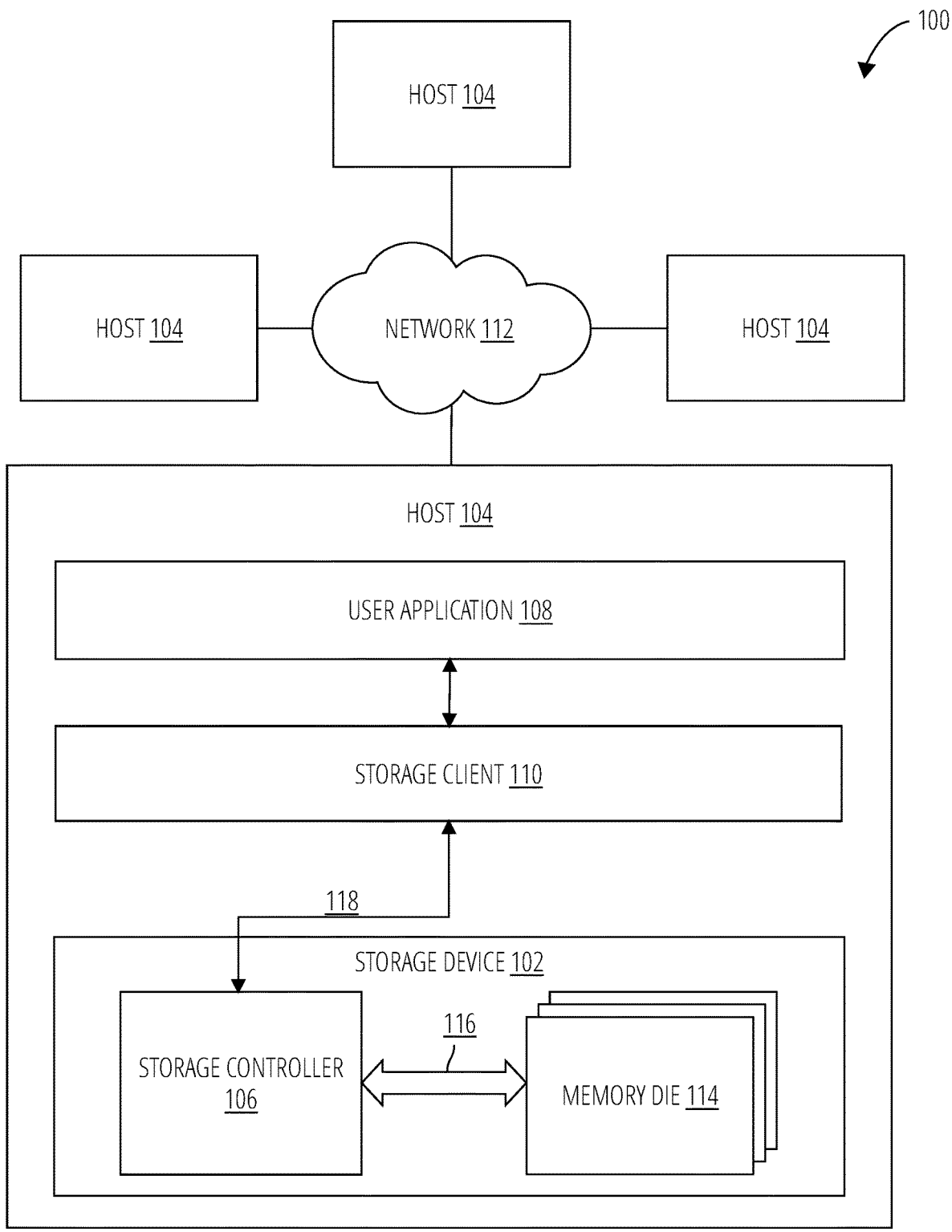
FIG. 1 illustrates a storage system 100 in accordance with one embodiment.

Current folding (also referred to as combining or merging) technology is slow and inefficient. Generally, folding is an operation wherein a non-volatile storage device combines bits in two or more memory cells into a single multi-level memory cell configured to hold the combined number of data bits. Through the solution implemented herein, folding may be performed in a way that preserves a majority of XOR parity data of storage blocks involved in the folding operation rather than regenerating the XOR parity data. The folding may also transfer and manage as little data as possible through copy-through-controller (CTC) operations and use of on-chip copy (OCC) operations instead.

"Copy-through-controller" refers to an operation that moves or copies data from a source storage block to a destination storage block in a manner that includes transferring the physical pages from the memory die to a storage controller and then transferring the physical pages, with certain modifications to the data back from the storage controller to the memory die before storing the data of the physical pages on the destination storage block.

"On-chip copy" refers to an operation that moves or copies data from a source storage block to a destination storage block such that the data remains within one or more memory die that are tasked to perform the on-chip copy. In certain embodiments, on-chip copy may be implemented by reading physical pages within each memory die of a non-volatile memory array into a page buffer within the respective memory die and then writing the physical pages into a destination storage block on the same memory die.

Aspects of the present disclosure may be embodied as an apparatus, system, method, or computer program product. Accordingly, aspects of the present disclosure may take the form of an entirely hardware embodiment, an entirely software embodiment (including firmware, resident software, microcode, or the like) or an embodiment combining software and hardware aspects that may all generally be referred to herein as a "circuit," "engine", "module," "apparatus," or "system." Furthermore, aspects of the present disclosure may take the form of a computer program product embodied in one or more non-transitory computer readable storage media storing computer readable and/or executable program code.

Some of the functional units described in this specification have been labeled as modules or engines, in order to more particularly emphasize their implementation independence. For example, a module or an engine may be implemented as a hardware circuit comprising custom VLSI circuits or gate arrays, off-the-shelf semiconductors such as logic chips, transistors, or other discrete components. A module or engine may also be implemented in programmable hardware devices such as field programmable gate arrays, programmable array logic, programmable logic devices, or the like.

"Logic" refers to machine memory circuits, non-transitory machine readable media, and/or circuitry (deleted) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Modules or engines may also be implemented at least partially in software for execution by various types of processors. An identified module or engine may, for instance, comprise one or more physical or logical blocks of computer instructions which may, for instance, be organized as an object, procedure, or function. Nevertheless, the executables of an identified module or engine need not be physically located together, but may comprise disparate instructions stored in different locations which, when joined logically together, comprise the module or the engine and achieve the stated purpose for the module or engine.

Indeed, a module or engine of executable code may include a single instruction, or many instructions, and may even be distributed over several different code segments, among different programs, across several memory devices, or the like. Where a module or engine or portions of a module or engine are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules or engines described herein, in certain embodiments, may alternatively be embodied by or implemented as a component.

"Circuit" refers to a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop).

For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like.

In one embodiment, a circuit may include custom VLSI circuits, gate arrays, logic circuits, or other integrated circuits; off-the-shelf semiconductors such as logic chips, transistors, or other discrete devices; and/or other mechanical or electrical devices.

A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to flowcharts, diagrams and/or schematic block diagrams of methods, apparatuses, systems, and computer program products according to embodiments of the disclosure. It will be understood that each block of the flowcharts and/or schematic block diagrams, and combinations of blocks in the flowcharts and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It may also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Similar or like numbers may refer to like elements in the figures, including alternate embodiments of like elements unless otherwise clear from context.

FIG. 1 is a schematic block diagram illustrating one embodiment of a storage system 100 that includes a storage device in accordance with the disclosed solution. The storage system 100 comprises a storage device 102, a storage controller 106, a memory die 114, at least one host 104, a user application 108, a storage client 110, a data bus 118, a bus 116, and a network 112. "Host" refers to any computing device or computer device or computer system configured to send and receive storage commands. Examples of a host include, but are not limited to, a computer, a laptop, a mobile device, an appliance, a virtual machine, an enterprise server, a desktop, a tablet, a main frame, and the like.

"Storage command" refers to any command relating with a storage operation.

Examples of storage commands include, but are not limited to, read commands, write commands, maintenance commands, configuration commands, administration commands, diagnostic commands, test mode commands, countermeasure commands, and any other command a storage controller may receive from a host or issue to another component, device, or system.

"Write command" refers to a storage command configured to direct the recipient to write, or store, one or more data blocks on a persistent storage media, such as a hard disk drive, non-volatile memory media, or the like. A write command may include any storage command that may result in data being written to physical storage media of a storage device. The write command may include enough data to fill one or more data blocks, or the write command may include enough data to fill a portion of one or more data blocks. In one embodiment, a write command includes a starting logical block address (LBA) and a count indicating the number of LBAs of data to write to on the storage media.

"Logical block address" or "LBA" refers to a value used in a block storage device to associate each of n logical blocks available for user data storage across the storage media with an address. In certain block storage devices, the LBAs may range from 0 to n per volume or partition. In block storage devices, each LBA maps directly to a particular data block, and each data block maps to a particular set of physical sectors on the physical storage media. "User data" refers to data that a host directs a non-volatile storage device to store or record.

"Data block" refers to a smallest physical amount of storage space on physical storage media that is accessible, and/or addressable, using a storage command. The physical storage media may be volatile memory media, non-volatile memory media, persistent storage, non-volatile storage, flash storage media, hard disk drive, or the like. Certain conventional storage devices divide the physical storage media into volumes or logical partitions (also referred to as partitions). Each volume or logical partition may include a plurality of sectors. One or more sectors are organized into a block (also referred to as a data block). In certain storage systems, such as those interfacing with the Windows® operating systems, the data blocks are referred to as clusters. In other storage systems, such as those interfacing with UNIX, Linux, or similar operating systems, the data blocks are referred to simply as blocks. A data block or cluster represents a smallest physical amount of storage space on the storage media that is managed by a storage controller. A block storage device may associate n data blocks available for user data storage across the physical storage media with an LBA, numbered from 0 to n. In certain block storage devices, the LBAs may range from 0 to n per volume or logical partition. In conventional block storage devices, a logical block address maps directly to one and only one data block.

The storage system 100 includes at least one storage device 102, comprising a storage controller 106 and one or more memory dies 114, connected by a bus 116. "Storage controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the storage controller is configured to store data on and/or read data from non-volatile memory media, to transfer data to/from the non-volatile memory device(s), and so on.

"Memory die" refers to a small block of semiconducting material on which a given functional circuit is fabricated. Typically, integrated circuits are produced in large batches on a single wafer of electronic-grade silicon (EGS) or other semiconductor (such as GaAs) through processes such as photolithography. The wafer is cut (diced) into many pieces, each containing one copy of the circuit. Each of these pieces is called a die or memory die. (Search "die (integrated circuit)" on Wikipedia.com, Oct. 9, 2019. Accessed Nov. 18, 2019.) It may be noted that the term "die" as used herein may be both singular and plural, e.g., one die, two die, three die, and so forth. Other plural forms of the word "die" sometime include "dice" and/or "dies."

A memory die is a die, in one embodiment, that includes one or more functional circuits for operating as a non-volatile memory media and/or a non-volatile memory array. "Non-volatile memory array" refers to a set of non-volatile storage cells (also referred to as memory cells or non-volatile memory cells) organized into an array structure having rows and columns. A memory array is addressable using a row identifier and a column identifier.

Depending on the context, a non-volatile memory array may refer to rows and columns of memory cells within a plane of a memory die, within a plurality of planes of the memory die, within a plurality of memory die within a non-volatile storage device, or within a plurality of non-volatile storage devices of a system.

"Memory cell" refers to a type of storage media configured to represent one or more binary values by way of a determinable physical characteristic of the storage media when the storage media is sensed, read, or detected to determine what binary value(s) was last stored in the memory cell. Memory cell and storage cell are used interchangeably herein.

A memory array is addressable using a row identifier and a column identifier. "Storage cell" refers to a type of storage media configured to represent one or more binary values by way of a determinable characteristic of the storage media when the storage media is sensed, read, or detected to determine a binary value(s) stored, or represented by, the determinable characteristic of the memory cell. Storage cell and memory cell are used interchangeably herein.

The type of determinable characteristic used to store data in a memory cell may vary depending on the type of memory or storage technology used. For example, in flash memory cells in which each memory cell comprises a transistor having a source lead, a drain lead and a gate, the determinable characteristic is a voltage level that when applied to the gate causes the memory cell to conduct a current between the drain and the source leads. The voltage level, in this example, is referred to herein as a threshold voltage. A threshold voltage may also be referred to as a control gate reference voltage (CGRV), read voltage, or reference voltage.

Examples of the determinable physical characteristic include, but are not limited to, a threshold voltage for a transistor, an electrical resistance level of a memory cell, a current level through a memory cell, a magnetic pole orientation, a spin-transfer torque, and the like.

"Non-volatile memory media" refers to any hardware, device, component, element, or circuit configured to maintain an alterable physical characteristic used to represent a binary value of zero or one after a primary power source is removed. Examples of the alterable physical characteristic include, but are not limited to, a threshold voltage for a transistor, an electrical resistance level of a memory cell, a current level through a memory cell, a magnetic pole orientation, a spin-transfer torque, and the like.

The alterable physical characteristic is such that, once set, the physical characteristic stays sufficiently fixed such that when a primary power source for the non-volatile memory media is unavailable the alterable physical characteristic can be measured, detected, or sensed, when the binary value is read, retrieved, or sensed. Said another way, non-volatile memory media is a storage media configured such that data stored on the non-volatile memory media is retrievable after a power source for the non-volatile memory media is removed and then restored. Non-volatile memory media may comprise one or more non-volatile memory elements, which may include, but are not limited to: chips, packages, planes, memory die, and the like.

Examples of non-volatile memory media include but are not limited to: ReRAM, Memristor memory, programmable metallization cell memory, phase-change memory (PCM, PCME, PRAM, PCRAM, ovonic unified memory, chalcogenide RAM, or C-RAM), NAND FLASH memory (e.g., 2D NAND FLASH memory, 3D NAND FLASH memory), NOR FLASH memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like.

While the non-volatile memory media is referred to herein as "memory media," in various embodiments, the non-volatile memory media may more generally be referred to as non-volatile memory. Because non-volatile memory media is capable of storing data when a power supply is removed, the non-volatile memory media may also be referred to as a recording media, non-volatile recording media, non-volatile storage media, storage, non-volatile memory, non-volatile memory medium, non-volatile storage medium, non-volatile storage, or the like. "Non-volatile storage media" refers to any hardware, device, component, element, or circuit configured to maintain an alterable physical characteristic (deleted) used to represent a binary value of zero or one after a primary power source is removed. Non-volatile storage media may be used interchangeably herein with the term non-volatile memory media.

In certain embodiments, data stored in non-volatile memory media is addressable at a block level which means that the data in the non-volatile memory media is organized into data blocks that each have a unique logical address (e.g., LBA). In other embodiments, data stored in non-volatile memory media is addressable at a byte level which means that the data in the non-volatile memory media is organized into bytes (8 bits) of data that each have a unique address, such as a logical address. One example of byte addressable non-volatile memory media is storage class memory (SCM).

In some embodiments, each storage device 102 may include two or more memory dies 114, such as flash memory, nano random-access memory ("nano RAM or NRAM"), magneto-resistive RAM ("MRAM"), dynamic RAM ("DRAM"), phase change RAM ("PRAM"), etc. In further embodiments, the data storage device 102 may include other types of non-volatile and/or volatile data storage, such as dynamic RAM ("DRAM"), static RAM ("SRAM"), magnetic data storage, optical data storage, and/or other data storage technologies.

The storage device 102 may be a component within a host 104 as depicted in here, and may be connected using a data bus 118, such as a peripheral component interconnect express ("PCI-e") bus, a Serial Advanced Technology Attachment ("serial ATA") bus, or the like. In another embodiment, the storage device 102 is external to the host 104 and is connected, a universal serial bus ("USB") connection, an Institute of Electrical and Electronics Engineers ("IEEE") 1394 bus ("FireWire"), or the like. In other embodiments, the storage device 102 is connected to the host 104 using a peripheral component interconnect ("PCI") express bus using external electrical or optical bus extension or bus networking solution such as InfiniBand or PCI Express Advanced Switching ("PCIe-AS"), or the like.

In various embodiments, the storage device 102 may be in the form of a dual-inline memory module ("DIMM"), a daughter card, or a micro-module. In another embodiment, the storage device 102 is a component within a rack-mounted blade. In another embodiment, the storage device 102 is contained within a package that is integrated directly onto a higher-level assembly (e.g., mother board, laptop, graphics processor). In another embodiment, individual components comprising the storage device 102 are integrated directly onto a higher-level assembly without intermediate packaging.

"Processor" refers to any circuitry, component, chip, die, package, or module configured to receive, interpret, decode, and execute machine instructions. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor core, and the like.

In a further embodiment, instead of being connected directly to the host 104 as DAS, the data storage device 102 may be connected to the host 104 over a data network. For example, the data storage device 102 may include a storage area network ("SAN") storage device, a network attached storage ("NAS") device, a network share, or the like. In one embodiment, the storage system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host 104 and the data storage device 102.

The storage system 100 includes at least one host 104 connected to the storage device 102. Multiple hosts 104 may be used and may comprise a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a host 104 may be a client, and the storage device 102 may operate autonomously to service data requests sent from the host 104. In this embodiment, the host 104 and storage device 102 may be connected using a computer network, system bus, Direct Attached Storage (DAS), or other communication means suitable for connection between a computer and an autonomous storage device 102.

The depicted embodiment shows a user application 108 in communication with a storage client 110 as part of the host 104. In one embodiment, the user application 108 is a software application operating on or in conjunction with the storage client 110. "Storage client" refers to any hardware, software, firmware, or logic component or module configured to communicate with a storage device in order to use storage services. Examples of a storage client include, but are not limited to, operating systems, file systems, database applications, a database management system ("DBMS"), server applications, a server, a volume manager, kernel-level processes, user-level processes, applications, mobile applications, threads, processes, and the like.

"Software" refers to logic implemented as processor-executable instructions in a machine memory (e.g., read/write volatile memory media or non-volatile memory media).

"Hardware" refers to functional elements embodied as analog and/or digital circuitry.

"Firmware" refers to logic embodied as processor-executable instructions stored on volatile memory media and/or non-volatile memory media.

The storage client 110 manages files and data and utilizes the functions and features of the storage controller 106 and associated memory dies 114. Representative examples of storage clients include, but are not limited to, a server, a file system, an operating system, a database management system ("DBMS"), a volume manager, and the like. The storage client 110 is in communication with the storage controller 106 within the storage device 102. In some embodiments, the storage client 110 may include remote storage clients operating on hosts 104 or otherwise accessible via the network 112. Storage clients may include, but are not limited to operating systems, file systems, database applications, server applications, kernel-level processes, user-level processes, applications, and the like.

In one embodiment, the storage system 100 includes one or more clients connected to one or more hosts 104 through one or more computer networks 112. A host 104 may be a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The network 112 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The network 112 may also include a network from the IEEE 802 family of network technologies, such Ethernet, token ring, WiFi, WiMax, and the like.

The network 112 may include servers, switches, routers, cabling, radios, and other equipment used to facilitate networking the host 104 or hosts 104 and clients. In one embodiment, the storage system 100 includes multiple hosts 104 that communicate as peers over a network 112. In another embodiment, the storage system 100 includes multiple storage devices 102 that communicate as peers over a network 112. One of skill in the art will recognize other computer networks comprising one or more computer networks and related equipment with single or redundant connection between one or more clients or other computer with one or more storage devices 102 connected to one or more hosts. In one embodiment, the storage system 100 includes two or more storage devices 102 connected through the network 112 to a remote host 104, without being directly connected to or integrated within a local host 104.

In one embodiment, the storage client 110 communicates with the storage controller 106 through a host interface comprising an Input/Output (I/O) interface. For example, the storage device 102 may support the ATA interface standard, the ATA Packet Interface ("ATAPI") standard, the small computer system interface ("SCSI") standard, and/or the Fibre Channel standard which are maintained by the InterNational Committee for Information Technology Standards ("INCITS").

In certain embodiments, the storage media of a memory device is divided into volumes or partitions. Each volume or partition may include a plurality of sectors. Traditionally, a sector is 512 bytes of data. One or more sectors are organized into a block (referred to herein as both block and data block, interchangeably).

In one example embodiment, a data block includes eight sectors which is 4 KB. In certain storage systems, such as those interfacing with the Windows® operating systems, the data blocks are referred to as clusters. In other storage systems, such as those interfacing with UNIX, Linux, or similar operating systems, the data blocks are referred to simply as blocks. A block or data block or cluster represents a smallest physical amount of storage space on the storage media that is managed by a storage manager, such as a storage controller, storage system, storage unit, storage device, or the like.

In some embodiments, the storage controller 106 may be configured to store data on one or more asymmetric, writeonce storage media, such as solid-state storage memory cells within the memory die 114. "Storage controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the storage controller is configured to store data on and/or read data from nonvolatile memory media, to transfer data to/from the nonvolatile memory device(s), and so on.

"Write once storage media" refers to a storage media such as a storage cell that is reinitialized (e.g., erased) before new data or a change to the data is written or programmed thereon. In other words, data of a write once storage media cannot be overwritten; the write once storage media must be erased before subsequently writing data to the write once storage media. "Asymmetric storage media" refers to a storage media having different latencies for different storage operations.

"Storage operation" refers to an operation performed on a memory cell in order to change, or obtain, the value of data represented by a state characteristic of the memory cell. Examples of storage operations include but are not limited to reading data from (or sensing a state of) a memory cell, writing (or programming) data to a memory cell, and/or erasing data stored in a memory cell.

Many types of solid-state storage media (e.g., memory dies) are asymmetric; for example, a read operation may be much faster than a write/program operation, and a write/ program operation may be much faster than an erase operation (e.g., reading the storage media may be hundreds of times faster than erasing, and tens of times faster than programming the storage media).

"Program" refers to a storage operation in which a characteristic of a memory cell is changed from a first state (often, an erased state) to a second state. A program storage operation may also be referred to as a write operation herein. "Write operation" or "Write command" refers to a storage command configured to direct the recipient to write, or store, one or more data blocks on a persistent storage media, such as a hard disk drive, non-volatile memory media, or the like. A write command may include any storage command that may result in data being written to physical storage media of a storage device. The write operation may include enough data to fill one or more data blocks, or the write operation may include enough data to fill a portion of one or more data blocks. In one embodiment, a write operation includes a starting LBA and a count indicating the number of LBA of data to write to on the storage media.

In certain embodiments, a program storage operation may include a series of iterations that incrementally change the characteristic until at least a target level of change is achieved. In other embodiments, a program storage operation may cause the attribute to change to a target level with a single iteration.

The memory die 114 may be partitioned into memory divisions that can be erased as a group (e.g., erase blocks) in order to, inter alia, account for the asymmetric properties of the memory die 114 or the like. As such, modifying a single data segment in-place may involve erasing the entire erase block comprising the data, and rewriting the modified data to the erase block, along with the original, unchanged data. This may result in inefficient write amplification, which may excessively wear the memory die 114.

"Erase block" refers to a logical erase block or a physical erase block. "Physical erase block" refers to smallest storage unit within a given memory die that can be erased at a given time (e.g., due to the wiring of storage cells on the memory die). In one embodiment, a physical erase block represents the smallest storage unit within a given memory die that can be erased at a given time (e.g., due to the wiring of storage cells on the memory die). In one embodiment, logical erase blocks represent the smallest storage unit, or storage block, erasable by a storage controller in response to receiving an erase command. In such an embodiment, when the storage controller receives an erase command specifying a particular logical erase block, the storage controller may erase each physical erase block within the logical erase block simultaneously. It is noted that physical erase blocks within a given logical erase block may be considered as contiguous within a physical address space even though they reside in separate dies. Thus, the term "contiguous" may be applicable not only to data stored within the same physical medium, but also to data stored within separate media.

Therefore, in some embodiments, the storage controller 106 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation). "Storage operation" refers to an operation performed on a memory cell in order to change, or obtain, the value of data represented by a state characteristic of the memory cell. Examples of storage operations include but are not limited to reading data from (or sensing a state of) a memory cell, writing (or programming) data to a memory cell, and/or erasing data stored in a memory cell.

Management of a data block by a storage manager includes specifically addressing a particular data block for a read operation, write operation, or maintenance operation. "Maintenance operation" refers to an operation performed on a non-volatile storage device that is configured, designed, calibrated, or arranged to improve or extend the life of the non-volatile storage device and/or data stored thereon.

A block storage device may associate n data blocks available for user data storage across the storage media with a logical address, numbered from 0 to n. In certain block storage devices, the logical addresses may range from 0 to n per volume or partition. "Logical address" refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like. A logical address does not indicate the physical location of data on the storage media but is an abstract reference to the data.

In conventional block storage devices, a logical address maps directly to a particular data block on physical storage media. In conventional block storage devices, each data block maps to a particular set of physical sectors on the physical storage media. However, certain storage devices do not directly or necessarily associate logical addresses with particular physical data blocks. These storage devices may emulate a conventional block storage interface to maintain compatibility with a block storage client 110.

In one embodiment, the storage controller 106 provides a block I/O emulation layer, which serves as a block device interface, or API. In this embodiment, the storage client 110 communicates with the storage device through this block device interface. In one embodiment, the block I/O emulation layer receives commands and logical addresses from the storage client 110 in accordance with this block device interface. As a result, the block I/O emulation layer provides the storage device compatibility with a block storage client 110.

In one embodiment, a storage client 110 communicates with the storage controller 106 through a host interface comprising a direct interface. In this embodiment, the storage device directly exchanges information specific to non-volatile storage devices. "Non-volatile storage device" refers to any hardware, device, component, element, or circuit configured to maintain an alterable physical characteristic used to represent a binary value of zero or one after a primary power source is removed. Examples of a non-volatile storage device include, but are not limited to, a hard disk drive (HDD), Solid-State Drive (SSD), non-volatile memory media, and the like.

A storage device using direct interface may store data in the memory die 114 using a variety of organizational constructs including, but not limited to, blocks, sectors, pages, logical blocks, logical pages, erase blocks, logical erase blocks, ECC codewords, logical ECC codewords, or in any other format or structure advantageous to the technical characteristics of the memory die 114. "Characteristic" refers to any property, trait, quality, or attribute of an object or thing. Examples of characteristics include, but are not limited to, condition, readiness for use, unreadiness for use, size, weight, composition, feature set, and the like.

A physical page may include memory cells along a row of a memory array for a single plane or for a single memory die. In one embodiment, the memory die includes a memory array made up of two equal sized planes. In one embodiment, a physical page of one plane of a memory die includes four data blocks (e.g., 16 KB). In one embodiment, a physical page (also called a "die page") of a memory die includes two planes each having four data blocks (e.g., 32 KB).

The storage controller 106 receives a logical address and a command from the storage client 110 and performs the corresponding operation in relation to the memory die 114. The storage controller 106 may support block I/O emulation, a direct interface, or both.

Figure 2:
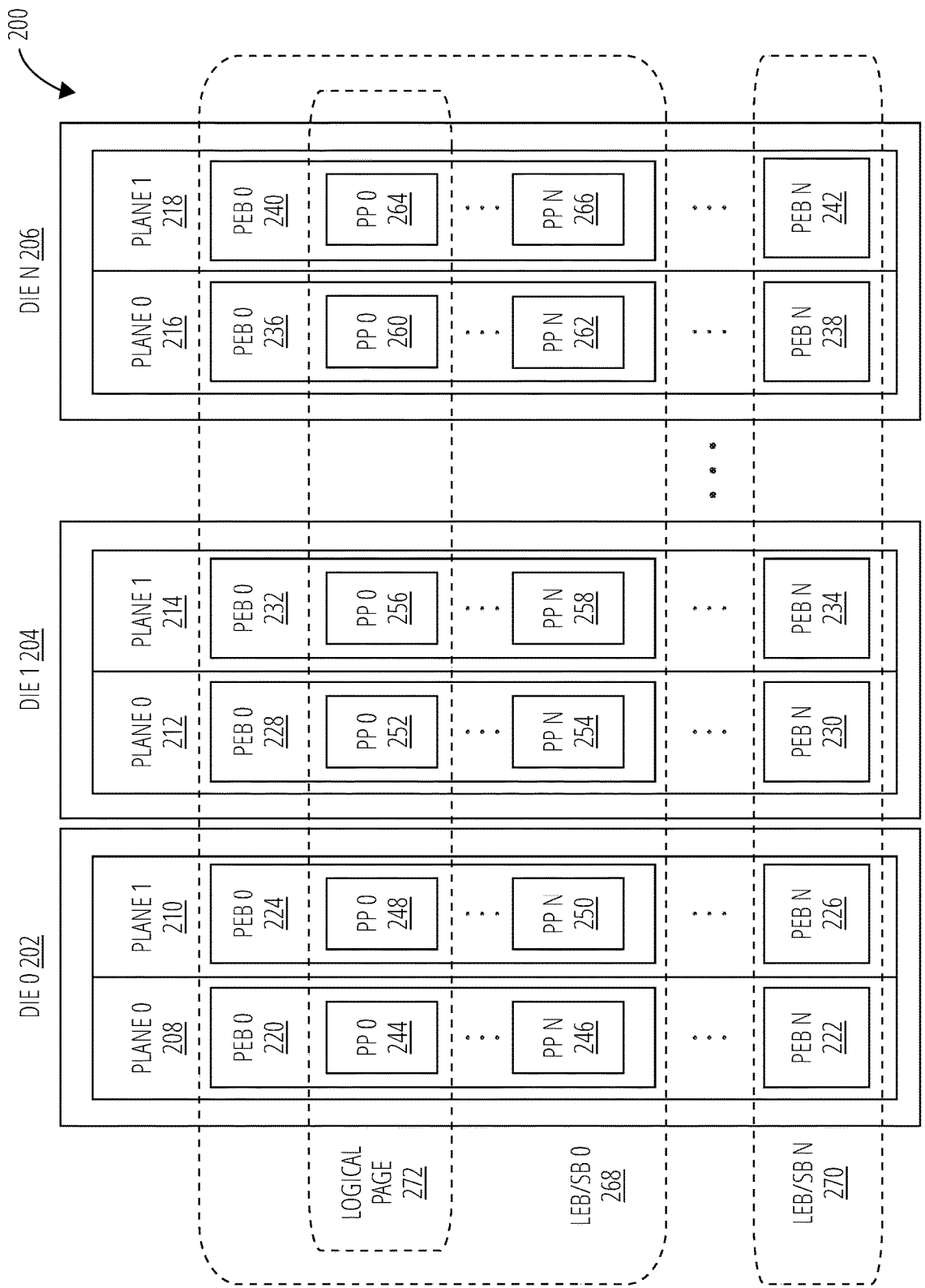
FIG. 2 illustrates a memory array 200 in accordance with one embodiment.

FIG. 2 illustrates a memory array 200 in accordance with one embodiment. The memory array 200 comprises a plurality of memory die, such as die 0 202, die 1 204, etc., through die n 206. In certain embodiments, a die is divided into physical planes, such as plane 0 208 and plane 1 210 of die 0 202, plane 0 212 and plane 1 214 of die 1 204, etc., through plane 0 216 and plane 1 218 of die n 206.

Each plane may be divided into physical erase blocks, as illustrated by physical erase block 0 220 through to physical erase block n 222 of plane 0 208, physical erase block 0 224 through to physical erase block n 226 of plane 0 plane 1 210, physical erase block 0 228 through to physical erase block n 230 of plane 0 212, physical erase block 0 232 through to physical erase block n 234 of plane 0 plane 1 214, physical erase block 0 236 through to physical erase block n 238 of plane 0 216, and physical erase block 0 240 through to physical erase block n 242 of plane 0 plane 1 218.

Each physical erase block can be divided into physical pages. For example, physical erase block 0 220 may include physical page 0 244 through physical page n 246, physical erase block 0 224 may include physical page 0 248 through physical page n 250, physical erase block 0 228 may include physical page 0 252 through physical page n 254, physical erase block 0 232 may include physical page 0 256 through physical page n 258, physical erase block 0 236 may include physical page 0 260 through physical page n 262, physical erase block 0 240 may include physical page 0 264 through physical page n 266.

In the illustrated embodiment, memory array 200 is further organized into logical erase blocks (LEBs), as shown by logical erase block/storage block 0 268 and logical erase block/storage block N 270 (also referred to herein as a "metablock" or "storage block"). These LEBs include multiple physical erase blocks (PEBs) illustrated by physical erase block 0 220, physical erase block n 222, etc. The physical erase blocks may be located in separate storage dies, shown as die 0 202, die 1 204, and die n 206.

Those of skill in the art appreciate the relationship and differences between physical erase blocks and a logical erase blocks and may refer to one, or the other, or both by using the shorthand names such as erase block, block, or storage block. Those of skill in the art understand from the context of the reference to an erase block whether a physical erase block or a logical erase block (or metablock or superblock) is being referred to. The concepts and techniques used in the art and those recited in the claims can be equally applied to either physical erase blocks or logical erase blocks.

As used herein, a "physical" structure such as a physical page, physical word line, physical erase block, physical plane, physical memory die, or the like, refers to a single physical structure that a controller, manager, module, or other logic component of a system can control and/or communicate with at some level within one or more levels of physical abstraction in the organization of the device, system, or apparatus. Similarly, a "logical" structure such as a logical page, logical word line, logical erase block, logical plane, logical memory die, or the like, refers to a collection of two or more single physical structures of that same type that a controller, manager, module, or other logic component of the system can control and/or communicate with at some level within one or more levels of physical abstraction in the organization of the device, system, or apparatus. It should be noted that one or the other or both a "physical" structure and a "logical" structure may have distinct addresses that can be used to identify one "physical" structure or "logical" structure relative to other structures of a similar nature and type.

A logical erase block such as logical erase block/storage block 0 268 or logical erase block/storage block N 270 is further divided into multiple logical pages (logical page 272) that, in turn, includes multiple physical pages, such as physical page 0 244, physical page 0 248, physical page 0 252, physical page 0 256, physical page 0 260, and physical page 0 264, as illustrated. Physical pages may include multiple packets, which may be grouped into error correction code (ECC) chunks.

In one embodiment, a physical page represents the smallest storage block within a given die that can be written to at a given time. In one embodiment, a physical page may comprise a single word line.

In another embodiment, a logical page is the smallest writable storage block supported by the storage controller. (in one embodiment, the storage controller may include a buffer configured to store up to a logical page worth of data; upon filling the buffer, the storage controller may write the contents of the buffer to a single logical page simultaneously.) In certain embodiments, a logical page may be referred to simply as a word line, with the understanding that the logical page includes one word line on each plane and/or memory die of the memory array 200.

In certain embodiments, the logical page spans planes within a memory die or spans planes within multiple memory die. In some instances, dividing a logical page across multiple dies may result in faster access times for a set of data when multiple dies are accessed in parallel. The logical page configurations may be mapped to any physical page on a die, or across a plurality of memory die, just as with logical erase blocks.

For example, a logical erase block may include metadata specifying, without limitation, usage statistics (e.g., the number of program erase cycles performed on that logical erase block, health statistics (e.g., a value indicative of how often corrupted data has been read from that logical erase block), security or access control parameters, sequence information (e.g., a sequence indicator), a persistent metadata flag (e.g., indicating inclusion in an atomic storage operation), a transaction identifier, or the like. In some embodiments, a logical erase block includes metadata identifying the logical addresses for which the logical erase block stores data, as well as the respective numbers of stored data blocks/packets for each logical block or sector.

In certain embodiments, the metadata comprises a cross temperature for logical erase block, an average cross temperature for open logical erase blocks of the non-volatile storage device, a temperature change rate, an average program erase count for a logical erase block, an uncorrectable bit error rate (UBER) for a logical erase block, a bit error rate, a fail bit count for a logical erase block, and a charge leak rate. In one embodiment, metadata may comprise a media characteristic.

Figure 3:
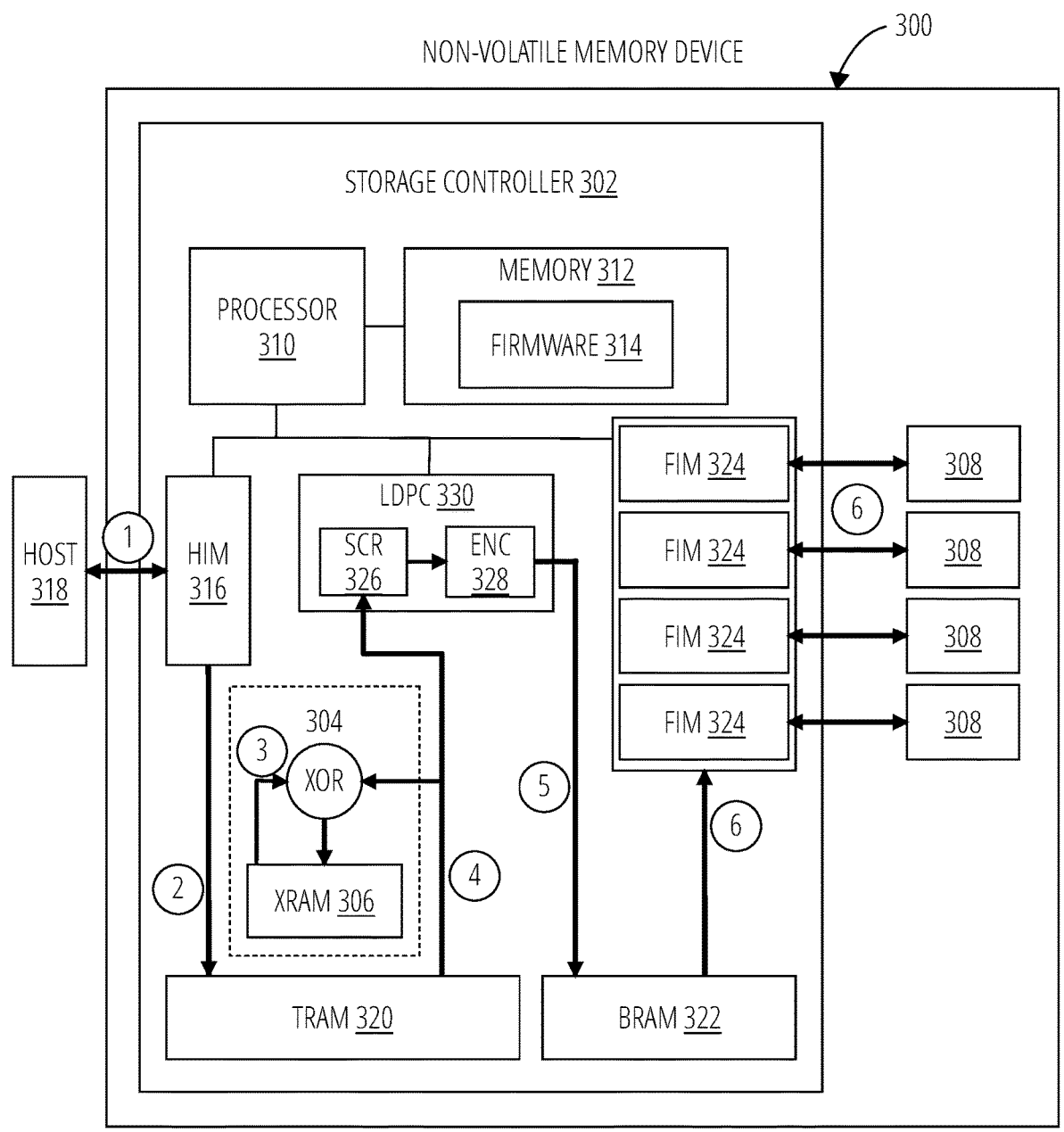
FIG. 3 illustrates one embodiment of a non-volatile storage media in accordance with one embodiment.

FIG. 3 is a schematic block diagram illustrating one embodiment of a non-volatile memory device 300 that includes a storage controller 302 with an XOR module 304 and XOR buffer memory (e.g., XRAM 306).

"XOR module" refers to any hardware, circuit, component, module, logic, device, or apparatus configured, programmed, designed, arranged, or engineered to compute, modify, adjust, or calculate XOR parity data. In certain embodiments, the XOR module applies a binary XOR function to two operands and produces a result which is the bitwise XOR of both operands.

"XOR parity data" refers to a particular type of parity data. Parity data refers to one or more bits associated with a string of binary code (set of ordered binary bits). Parity bits, and parity data, may be used as the simplest form of error detecting code. Parity bits, and parity data, may generally be applied to the smallest units of a communication protocol or data being exchanged, typically 8-bit octets (a byte), although parity data can also be applied separately to an entire message string of bits or set of data. (Search "parity bit" on Wikipedia.com May 9, 2020. Modified. Accessed May 20, 2020.)

XOR parity data is a particular type of parity data that may be used to leverage a property of an XOR operation in which an XOR operation is its own inverse. XOR parity data may be combined for multiple sets of commonly configured data to enable error correction of the data through a reverse XOR operation. This combining is referred to herein as accumulating XOR parity data (e.g., accumulating XOR parity data).

In certain embodiments, XOR parity data may comprise an XOR result from a bitwise XOR operation of a string of binary data being protected and another XOR result or an initial parity data set, such as a set of zeros. XOR parity data may also be used with the XOR binary function to recover a set of data, provided a copy of each data set used to generate an XOR parity data result is available except for the data set being recovered.

In some embodiments, an XOR module 304 may compute XOR parity data for one or more storage blocks of non-volatile memory. In at least one embodiment, the non-volatile memory device 300 may efficiently control a non-volatile memory 308 using a storage controller 302 that includes an XOR module 304 that uses buffer memory (e.g. XRAM 306) for temporarily storing XOR parity data.

"Buffer memory" refers to an area of a memory media configured to temporarily store a set of data, particularly data being sent to or received from another component or device. In certain aspects, the memory media used for the instruction buffer may be read only memory (ROM), static random-access memory (SRAM), dynamic random-access memory (DRAM), or the like. XOR buffer memory" refers to a buffer memory used to temporarily store XOR parity data. In some embodiments, the XOR module 304 may be implemented using any of the hardware and/or software structures described above (e.g., processors, logic gates, programmable logic, firmware, software, and so forth) with respect to modules and/or engines.

In one embodiment, the non-volatile memory device 300 may include one or more non-volatile memories 308. For example, in one embodiment nonvolatile memories may include NAND flash memory. However, in some embodiments, nonvolatile memories may include any type of non-volatile memory for which XOR parity data may be useful. In some embodiments, nonvolatile memory may include optical media, magneto-resistive memories, resistive memories and so forth. In some embodiments, a storage controller 302 may include a processor 310 that accesses memory 312 that may include firmware 314 (sometimes referred to as flash die controller firmware or "FW") as well as other data.

In some embodiments, the processor 310 may be a multicore processor that may include one or more data path cores that process data in the data path from the host to the non-volatile memories 308. In some embodiments, the functions described as being performed by the processor 310 may alternatively, or in combination, be performed by logic devices and/or firmware which may be executed by a state machine, a processor core, or any other device capable of executing specific or general instructions and/or functions. In some embodiments, the processor 310 may access a host interface module 316 ("HIM") by which the host 318 may access data on the non-volatile memory device 300.

In one embodiment, a write operation may occur generally as depicted in six high-level steps numbered one through six shown in circles in FIG. 3. At step one, the host interface module 316 may receive notification of a command and may fetch the command from host memory space. In some embodiments, if the host interface module 316 determines that the command is a write command, the host interface module 316 may parse the command and notify the firmware 314 (running on the processor 310). In one embodiment, the firmware 314 may schedule a write operation, determine the target physical address and reserve buffers in a transfer RAM ("TRAM 320"). In one embodiment, at step two, the host interface module 316 transfers data from a host 318 to TRAM 320. In one embodiment, the host interface module 316 then sends a response to the host 318 for cached host transfers.

In some embodiments, the storage controller 302 may include an XOR module 304 that may compute XOR parity data for data that is written to one or more non-volatile memories 308. In one embodiment, at step three, the firmware 314 passes the command to data path cores in the processor 310 to start processing stored data in the TRAM 320 e.g., by transferring data from the TRAM 320 to an XOR module 304. In some embodiments, the XOR module 304 may successively perform bit wise exclusive 'or' ("XOR") operations on the data that is to be written to the non-volatile memory and a location in memory that contains the result of prior XOR operations using an operation referred to herein as accumulating XOR parity data. "Accumulating XOR parity data" refers to successively performing a bitwise XOR operation between a previous XOR operation result and a similarly configured set of data, such as data in another similarly sized memory or storage location.

In some embodiments, the XOR module 304 may update XOR parity data in XOR buffer memory (sometimes known as XRAM 306 or an XOR RAM). In other words, XOR parity data previously stored in the XRAM 306 is XORed with the data that is to be written and the result is stored back to the XRAM 306.

In some embodiments, the XOR buffer memory (e.g., XRAM 306) may include memory selected from the group consisting of 6T SRAM, resistive RAM ("ReRam"), DRAM, and/or combinations thereof. In some embodiments, the selection of the type of memory may be determined by evaluating factors such as density, cost, manufacturing process steps, performance, and so forth of the selected memory type for the storage controller 302 for a given application.

In some embodiments, individual die of non-volatile memory 308, such as for example, NAND flash, may be implemented as separate die from the other memory in the storage controller 302. The non-volatile memory 308 may include a die controller. "Die controller" refers to a set of circuits, circuitry, logic, or components configured to manage the operation of a die. In one embodiment, the die controller is an integrated circuit. In another embodiment, the die controller is a combination of discrete components. In another embodiment, the die controller is a combination of one or more integrated circuits and one or more discrete components.

In other embodiments, certain portions of the memory such as XOR scratch memory, which may also sometimes be referred to as a temporary (or temp) storage block, may be implemented for example in single level cell ("SLC") NAND flash that is on the same die as the non-volatile memory 308. "Scratch memory" refers to a section of memory that temporarily stores data for use in subsequent operations. In some embodiments, the term "XOR scratch memory" refers to scratch memory that may be used to store results of XOR operations. In some embodiments, the XOR scratch memory may be implemented in SLC memory which may be advantageous because SLC memory typically has higher density, than for example SRAM.

In some embodiments, portions, or all, of the non-volatile memory 308 may be implemented on the same die as other portions of the storage controller 302 with the processing logic and/or certain portions of SRAM implemented on the lower layers of the die and the nonvolatile memory e.g., NAND flash may be implemented on higher layers.

In some embodiments, the XOR module 304 may include a low-density parity check ("LDPC") LDPC engine 330 coupled to the XOR buffer memory (XRAM 306). In some embodiments, an LDPC engine 330 may include a scrambler 326 and an encoder 328.

In some embodiments, at step 4, data from the TRAM 320 is transferred to a scrambler 326 and an encoder 328 within an LDPC engine 330. In some embodiments, at step five, after data is scrambled and/or encoded an LDPC engine 330 transfers scrambled/encoded data to a buffer RAM (sometimes referred to as "BRAM 322"). At step six, the data in the buffer RAM (BRAM 322) may be read by a FLASH interface module 324 ("FIM") and transferred to a non-volatile memory 308.

It may be noted by one of ordinary skill that while nomenclature used in describing the storage controller 302 sometimes indirectly refers to flash memory as in FLASH interface module 324, a storage controller 302 may in some embodiments be used for types of non-volatile memory 308 other than flash memory (e.g. NAND flash) for which XOR parity data may be beneficially used for detecting and/or correcting errors.

In some embodiments, the processor 310 issues commands to read the non-volatile memory 308 (e.g. NAND Flash) in different sized chunks of data (e.g., 16 kB/32 kB). In some embodiments, a read request is passed to a FLASH interface module 324. In one embodiment, a command to read data from non-volatile memory 308 is passed to the FLASH interface module 324 which uses a Direct Memory Access (DMA) engine to read a chunk of data of a predetermined size.

Figure 4:
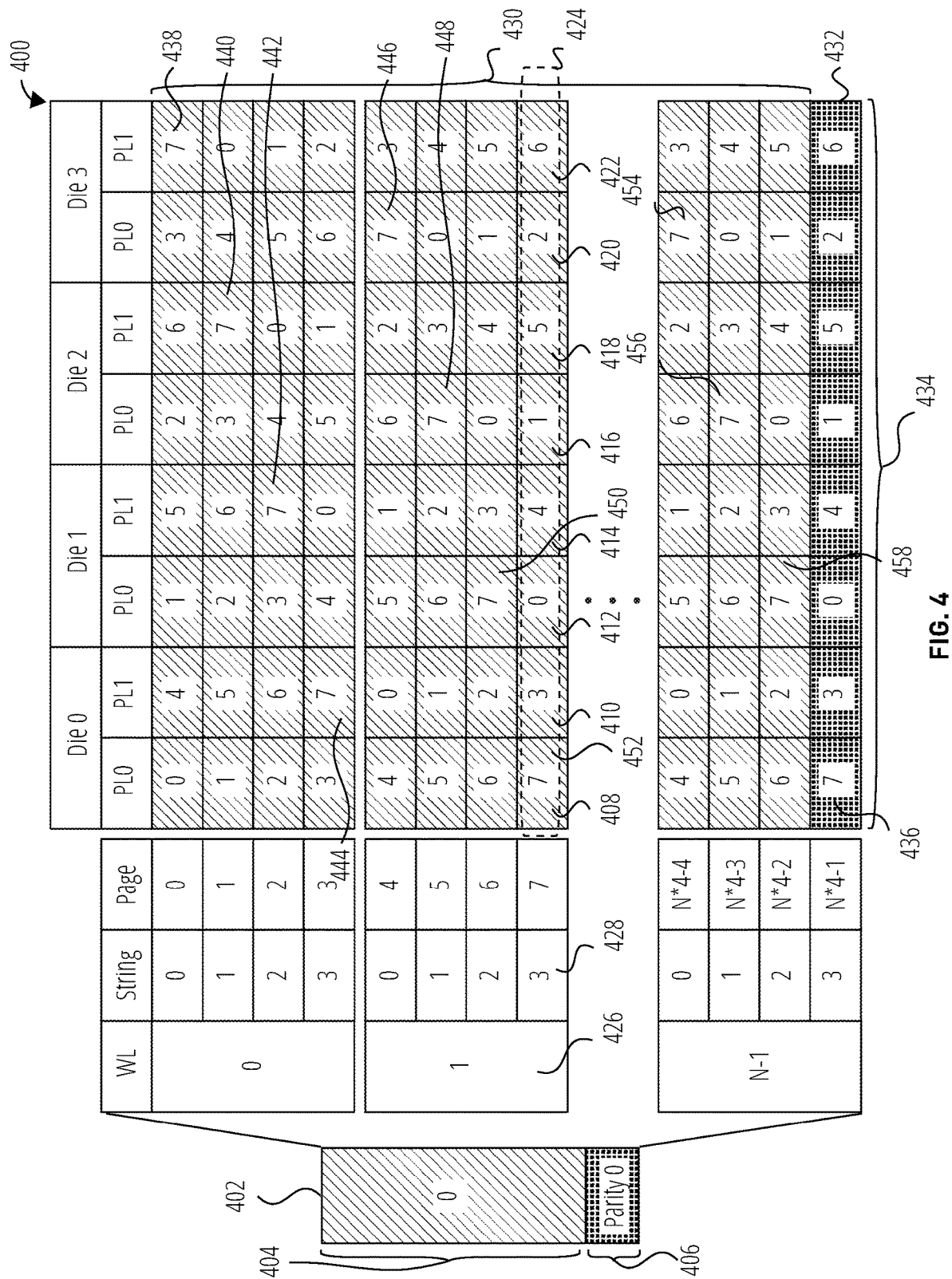
FIG. 4 illustrates a parity bin map 400 in accordance with one embodiment.

FIG. 4 illustrates a parity bin map 400 in accordance with one embodiment. "Parity bin map" refers to a configuration, design, arrangement, plan, mapping or the like that identifies which physical pages are to be combined in an XOR operation (referred to as accumulating XOR parity data) to generate XOR parity data for an associated parity bin.

In certain embodiments, a parity bin map is designed based a physical layout of physical pages, physical planes, and memory die within a non-volatile memory array and accounts for distribution of the physical pages among memory die, memory planes, logical pages across the non-volatile memory array as well as logical pages stored within strings and/or word lines of the non-volatile memory array. In such embodiments, the parity bin map may be organized such that XOR parity data of a parity bin and each physical page used to generate the XOR parity data of the parity bin may be used to recover or re-create certain physical pages of the non-volatile memory array in response to certain errors or faults that may occur in the non-volatile memory array.

In particular, the parity bin map may be configured to enable recovery of physical page data for one or more of the most common errors or faults (e.g. Word line to word line shorts, logical page read errors, etc.) In another aspect, XOR parity data may map from physical pages to parity bins among alternating word lines (e.g., logical pages) such that each physical page of a logical page can be recovered if needed, for example in response to a word line to word line short within a single plane.

In one embodiment, the parity bin map is implemented based on which physical pages among the rows and columns of a non-volatile memory array are assigned or otherwise associated with a parity bin. In other words, the parity bin map may not be represented in the storage device using a data structure and instead may be a logical construct. In another embodiment, the parity bin map is represented by data structure that associates parity bins with the physical pages, member pages, used in accumulating XOR parity data to generate the XOR parity data of the parity bin.

"Word line to word line short" refers to a type of error condition in which one or more word lines have an electrical short between a structure of the word line and another structure, such as another word line, such that word lines included in the word line to word line short are unusable and data on the word lines has too many errors.

FIG. 4 illustrates a storage block 402 in block diagram format showing a logical set of logical pages organized into a data section 404 and a parity section 406. "Data section" refers to one part of a storage block. A data section stores data blocks within the storage block. The data block may include XOR parity data in addition to any XOR parity data stored in a parity section associated with the data section. For example, the data block may store one or more codewords that include data and error correction code data (another form of XOR parity data) that protects the data of the codeword.

The data section may be organized in a variety of ways in different embodiments. In certain embodiments, the data section includes a plurality of logical pages each made up of physical pages that span planes and memory die of a non-volatile memory array.

"Parity section" refers to one part of a storage block. A parity section stores XOR parity data for a set of parity bins that enable a data recovery process for one, or both of, physical pages within a logical page of the storage block and one or more logical pages of the storage block.

In one embodiment, a parity section includes one or more parity rows. In a storage block that stores a single bit per memory cell, the storage block may include a single parity row. In a storage block that stores a multiple bits per memory cell (e.g., MLC, TLC, QLC, PLC), the storage block may include a parity row associated with each level of bits stored within the memory cells. For example, three parity rows for storage blocks storing three bits per cells. Four parity rows for storage blocks storing four bits per cells.

FIG. 4 also includes an exploded view showing details for how one embodiment can map physical pages to parity bins, this is represented by the parity bin map 400. The parity bin map 400 represents which physical pages within a storage block map, or are associated with, a particular parity bin. FIG. 4 illustrates how physical pages (e.g. physical page 408, physical page 410, physical page 412, physical page 414, physical page 416, physical page 418, physical page 420, and physical page 422) of a logical page 424 may map to word lines (e.g., word line 426) and strings (e.g., string 428) and memory die and physical planes within storage block 402. "String" refers to a structural sub-dividing of a word line within a non-volatile memory array. In certain embodiments, a word line is divided into four strings. If should be noted that a string is distinct, different from, and not to be confused with a NAND string. A string is associated with a number of logical pages depending on how many bits are stored in each memory cell of the word line.

If the word line stores one bit per memory cell, then each string is associated with a single logical page. If the word line stores two bits per memory cell, then each string is associated with two logical pages. If the word line stores three bits per memory cell, then each string is associated with three logical pages. If the word line stores four bits per memory cell, then each string is associated with four logical pages.

FIG. 4 illustrates that the storage block 402 is configured to store a single bit per memory cell (SLC). This can be seen by the mapping of a single logical page 424 to each individual string 428. If a storage block stores two bits per memory cell the string maps to two logical pages. If a storage block stores three bits per memory cell the string maps to three logical pages. If a storage block stores four bits per memory cell the string maps to four logical pages.

With the mapping illustrated in parity bin map 400, each physical page can be assigned a particular parity bin. "Parity bin" refers to a data structure configured to hold XOR parity data, the XOR parity data is designed, engineered, and/or configured to enable recovery of one of one or more logical pages of a storage block or a physical page within a logical page of the storage block by a data recovery process that includes XOR parity data of the parity bin and data within a set of physical pages and/or logical pages of the storage block associated with the parity bin.

In one embodiment, a parity bin is associated with a plurality of physical pages referred to as member pages. In one embodiment, the XOR parity data of the parity bin is a result of a bitwise XOR operation of data from each of the member pages.

In certain embodiments, the member pages for a parity bin are designated such that a reverse XOR operation can be used to recover data in one of the member pages. In certain embodiments, the parity bins for storage blocks are designated, or configured, such that a reverse XOR operation can be used to recover data in one or more logical pages of a storage block, including a storage block that stores multiple-bits per memory cell.

The data section 404 includes a number of data rows 430 and the parity section 406 includes a parity row 432. "Parity row" refers to a set of parity bins that together store XOR parity data for level of bits stored within multi-level memory cells of a storage block. XOR parity data is stored in a parity row 432 having a plurality of parity bins.

The XOR parity data may be distributed among the parity bins to enable data recovery of a logical page out of a plurality of logical pages within a storage block associated with the parity section. Parity bins 434 in the parity row 432 store XOR parity data for member physical pages. The relationship between a parity bin and its member physical pages is represented by the common reference numeral inside the member physical pages and corresponding parity bin. For example, parity bin 436 with reference number '7' holds accumulated XOR parity data for each member physical page that also includes the reference number '7' (e.g., member page 438, member page 440, member page 442, member page 444, member page 446, member page 448, member page 450, member page 454, member page 456, and member page 458)

The parity bin map 400 includes a single parity row 432 because the memory cells of the storage block 402 store a single bite per memory cell.

The parity bins may be mapped such as across alternate word lines (i.e., WL0, WL2, WL4 and so on) to enable recovery of data by XORing non-erroneous member pages to re-generate an erroneous member page. Certain mappings, such as the mapping shown in FIG. 4, may protect against word line to word line shorts within a single plane. The parity bins may be stored at the end of the block so that read protection may also be provided on the block later if a write failure is not detected, or data retention related issues occur.

FIG. 5 is a block diagram illustrating one embodiment of a storage block of non-volatile memory configured to store four bits of data in each memory cell. The FIG. 5 illustrates a QLC storage block parity bin map 500 for the QLC storage block. The storage block includes a data section 502 and a parity section 504 that can be written when a storage controller determines to close the storage block. In one aspect, the storage controller 302 stores data on the logical page of a storage block until all of the data section 502 is full and then stores the parity section 504. As with FIG. 4, the parity section 504 includes parity rows 506, one for each set of logical pages for the four bits stored in each memory cell. In this manner, the parity section 504 of a storage block includes a parity row 506 for each logical page stored within multi-level cells of the storage block.

Each parity row 506 includes parity bins 508 (also referred to as XOR bins) for use in error detection and/or correction of the non-volatile memory by the storage controller 302.

In one example embodiment, the table 200 refers to multiple die of non-volatile memory 308 e.g., Die0, Die1, Die2, Die3, as shown on the top row of the QLC storage block parity bin map 500. In one embodiment, each die may be organized as two planes PL0 and PL1. In another embodiment, each die may be organized as four planes, e.g. PL0, PL1, PL2, PL3. The apparatuses and methods disclosed herein may be used in various memory devices with different organizations between the number of planes and the number of die. The non-volatile memory 308 may be accessed in pages of, for example, 16 kB. Each entry in the QLC storage block parity bin map 500 may be assigned such that parity information for the assigned location may be accumulated to a particular XOR parity bin (e.g. a binary number). One parity bin 508 may include 16 kB worth of XOR parity data for the assigned memory locations (member physical pages).

In the depicted embodiment, a parity bin 508 may be a bitwise XOR of a set of member pages (e.g., those with the same reference number as the parity bin 508). So, for example, a parity bin 1:

$$\text{Parity Bin } 1 = PG_A \oplus PG_B \oplus PG_C$$

XOR Operation where "PG" stands for page and "s" represents a bitwise XOR operation. Generating the XOR parity data for a parity bin generates combined XOR parity data which is stored in the parity bin. Performing the XOR operation using the member pages to generate the combined XOR parity data is referred to as accumulating XOR parity data. "Combined XOR parity data" refers to an XOR parity data calculation that combines XOR parity data from two sets of data. In one example, data in one storage block of nonvolatile memory is combined using, for example, a bitwise exclusive or (e.g., XOR) operation, with data in a second storage block. The output of the bitwise XOR operation is combined XOR parity data. As needed, the output of the bitwise XOR operation can be combined with another set of data from a storage block to create a new set of combined XOR parity data.

Based on a number of storage blocks for which XOR parity data is to be combined into combined XOR parity data, a process of successive bitwise XOR operations (termed accumulating XOR parity data) may be performed on the data of each storage block in order to generate combined XOR parity data.

Thus, in one embodiment, XOR parity data from one open storage block of nonvolatile memory may be combined with XOR parity data from another, or each of a plurality of storage blocks, of nonvolatile memory to generate combined XOR parity data.

Because an XOR operation is its own inverse, the binary value of one page, e.g., $PG_A$ may be recovered by reversing the XOR process, which means, as used herein, XORing the XOR parity data of the parity bin with data from each of the other member pages.

$$PG_A = \text{Parity Bin } 1 \oplus PG_B \oplus PG_C$$

Reverse XOR Operation

"Reverse XOR operation" refers to removing XOR parity data accumulated for data of a particular memory location by performing an additional XOR operation with the accumulated XOR parity data and data in the particular memory location. A reverse XOR operation backs out, reverses, or removes the influence of data used to generate original XOR parity data.

Successive XOR operations on data of a storage block may be done to accumulate XOR parity data for the storage block or in the case of reverse XOR operations to remove XOR parity data for the storage block from the accumulated XOR parity data. In some embodiments, XOR parity data may be generated through use of an exclusive OR operation also referred to as an XOR operation. In other embodiments, other operations or combinations of operations may be used to generate XOR parity data.

In some embodiments, a first XOR operation for data of a physical page may be, for example, between a result location that may be initialized to binary zero which may be then XORed with the data data of the physical page which results in the contents of the physical page being accumulated to the XOR result since zero XORed with any binary number results in the binary number. Then that XOR result may be XORed with another physical page.

Thus, by successively performing bitwise XOR operations between a result and a successive physical page, XOR parity data may be accumulated. In some embodiments, storage block of nonvolatile memory e.g., NAND flash may be scanned in order to store XOR parity data for the physical pages of the storage block so that the XOR parity data may be written to the parity section 504 and the storage block may be closed.

Combined XOR parity data may be Xored other XOR parity data to remove or reverse the influence of the XOR parity data. As used herein combined XOR parity data refers to accumulated XOR parity data from at least two different blocks of memory. In some embodiments, the combined XOR parity data may be accumulated by XORing a previous parity result (XOR parity data) with data from two, three, or any number of physical pages of nonvolatile memory.

In some embodiments, XOR parity data for write data to be written to each page of the non-volatile memory 308 may be computed and assigned to one parity bin 508 for detecting word line to word line errors and to a different parity bin for detecting plane to plane errors.

It may be noted that the numbering of the assigned member pages to parity bins in the QLC storage block parity bin map 500 may be staggered in a checkerboard-like pattern so that no repeating parity bin numbers are adjacent to each other on planes PL0 and PL1. This helps use of the XOR parity data to detect plane-to-plane shorts. Similarly, there are no repeating parity bins on paired local word lines ("LWL") which helps the use of parity to detect word line to word line shorts. In some embodiments, the general rule may be that whenever there is a failure in the memory, pages which have unique bin numbers may be recovered. Thus, the staggered pattern may enable detection and recovery of multiple types of NAND failures.

In some embodiments, the XOR module 304 accumulates XOR parity data for parity bins each time one of the storage blocks of nonvolatile memory is written to. In some embodiments, the data may be not directly accumulated to the parity bin 508 of the nonvolatile memory. Rather the data may be written to one or more XOR buffer memories e.g. within XRAM 306 until the die controller determines to close a storage block at which time the XOR module 304 may program one or more parity rows into the storage block.

Figure 6:
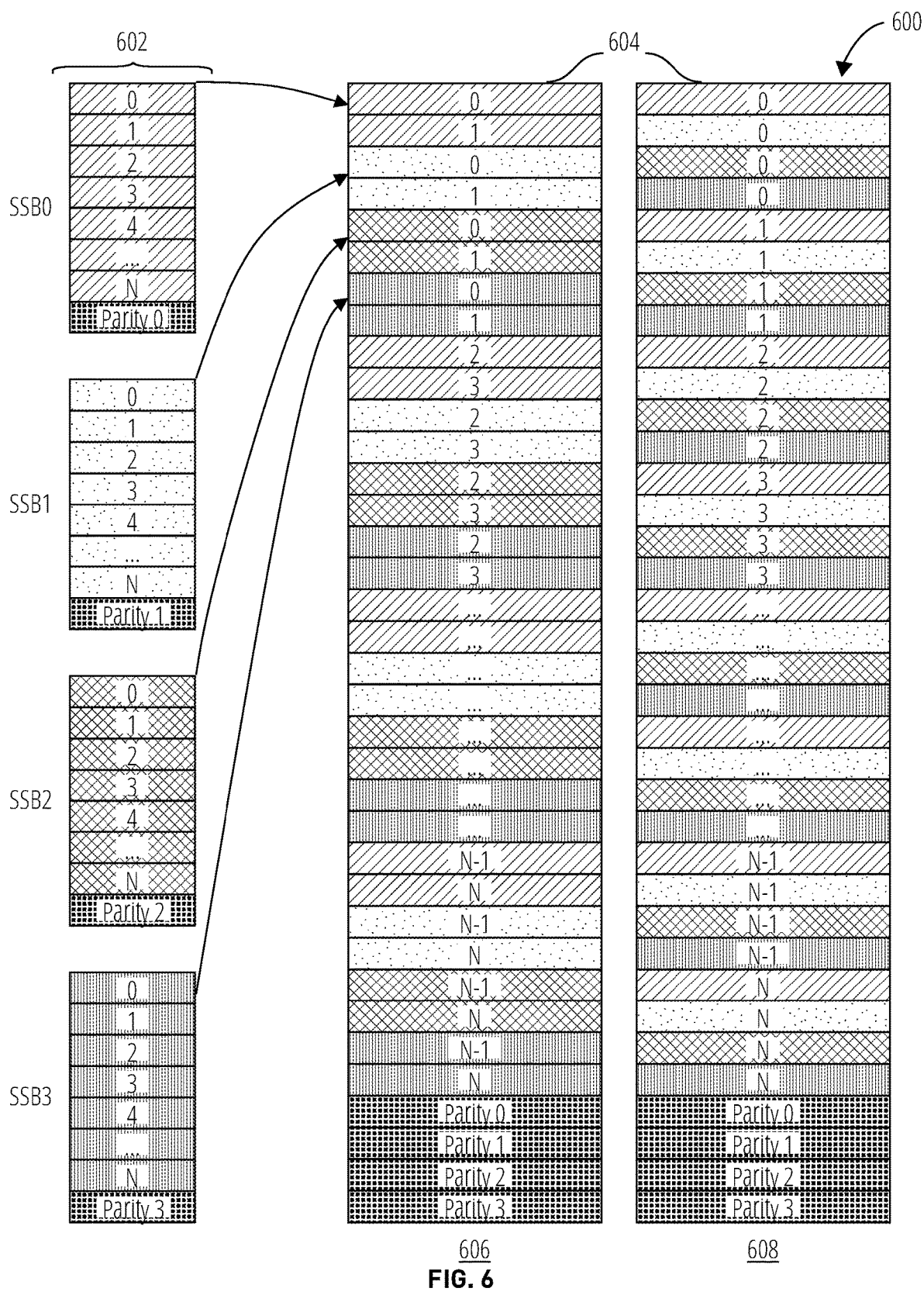
FIG. 6 illustrates a folding or combining operation 600 in accordance with one embodiment.

FIG. 6 illustrates a folding or combining operation 600 in accordance with one embodiment. The folding or combining operation 600 involves incorporating data blocks and XOR parity data from multiple source storage blocks 602 into a destination storage block 604. Two alternative types of organization (interleaving) of the destination storage block 604 are illustrated: a destination storage block using two-page interleave 606 and a destination storage block using one-page interleave 608.

"Source storage block" refers to a storage block that supplies data blocks for a merging, combining, or folding operation in which data blocks from two or more source storage blocks are combined to write the data blocks in a destination storage block.

In one embodiment, the source storage blocks and destination storage block are configured such that the data block fit within the destination storage block without any remaining data, or data blocks, that exceed the storage capacity of the destination storage block. For example, if the source storage blocks are single level cell (SLC) storage blocks that each hold one bit per memory cell, then the destination storage block is an Multi-level cell (MLC, two bits per memory cell) storage block, a tri-level cell (TLC, three bits per memory cell), a Quad-level cell (QLC, four bits per memory cell), a Penta-level cell (PLC, five bits per memory cell), or the like.

"Destination storage block" refers to a storage block that receives data blocks as part of a merging, combining, or folding operation in which data blocks from two or more source storage blocks are combined to write the data blocks in the destination storage block.

In one embodiment, the source storage blocks and destination storage block are configured such that the data block fit within the destination storage block without any remaining data, or data blocks, that exceed the storage capacity of the destination storage block. For example, if the source storage blocks are single level cell (SLC) storage blocks that each hold one bit per memory cell, then the destination storage block is an Multi-level cell (MLC, two bits per memory cell) storage block, a tri-level cell (TLC, three bits per memory cell), a Quad-level cell (QLC, four bits per memory cell), a Penta-level cell (PLC, five bits per memory cell), or the like.

FIG. 6 folding or combining operation 600 shows the folding mechanism where the data from four full source storage blocks 602 (SSB0, SSB1, SSB2, and SSB3) is folded in an interleaved manner, and the parity rows are folded in the same fashion. The logical pages of each source storage block are designated by assigned numbers and a different shading pattern. Destination storage block using two-page interleave 606 as shown incorporates two pages (page 0 and page 1) from SSB0, then two pages from SSB1, and so on. Destination storage block using one-page interleave 608, alternately, takes page 0 from each source storage block 602, then page 1, etc.

An interleaved approach provides the different parity rows for the coverage of word line to word line short. The interleaved parity rows are stored at the end of the destination storage block 604. Here interleaving is done at a logical page level or also referred to as a word line level. The page interleaving provides the most scattered parity bins for a source storage block. In this manner, if the failures are limited to a plane or single source storage block, then the failures will be scattered to various physical pages in a quad-level memory cell (QLC) block which enables recovery using XOR operations, providing better protection.

Figure 7:
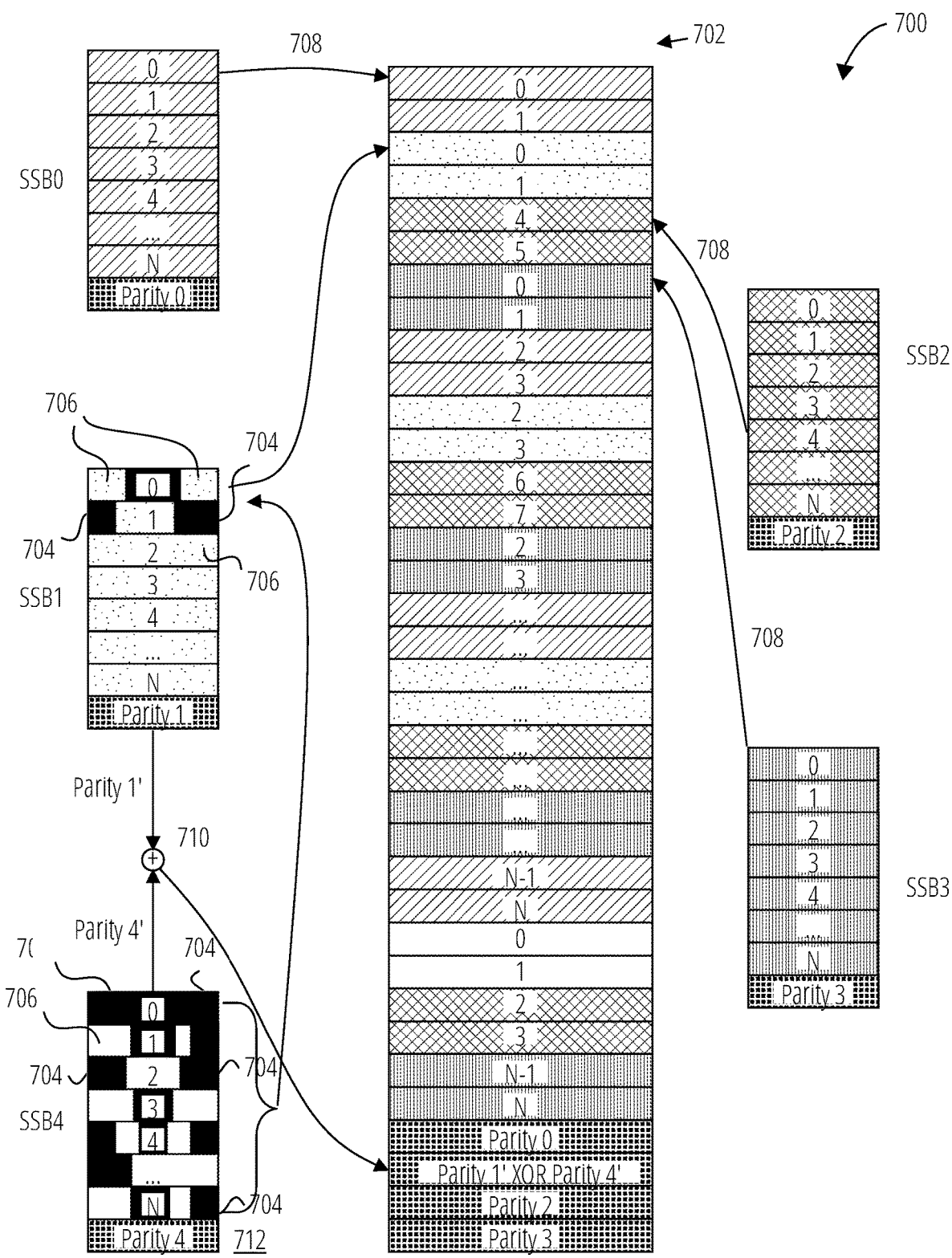
FIG. 7 illustrates a folding or combining operation 700 in accordance with another embodiment.

FIG. 7 illustrates a folding or combining operation 700 in accordance with one embodiment. In the folding or combining operation 700 a storage controller may draw from a plurality of source storage blocks and merge the data into a destination storage block 702. FIG. 7 illustrates complete source storage blocks and fragmented source storage blocks. SSB0, SSB2, and SSB3 are complete source storage blocks. "Complete source storage block" refers to a source storage block comprising a data section having exclusively valid data and a valid parity section. A complete source storage block has no invalid data, failed word lines, or bad word lines.

SSB1 and SSB4 are fragmented source storage blocks. "Fragmented source storage block" refers to a source storage block that includes one or more bad word lines and/or one or more failed word lines within the data section of the source storage block. In addition, a source storage block that includes one or more data blocks of invalid data is also a fragmented source storage block.

Typically, a fragmented source storage block includes fewer valid data blocks than a complete source storage block and/or a whole source storage block.

Typically, a fragmented source storage block includes an invalid parity section. The invalid parity section of a fragmented source storage block may be converted into a valid parity section.

However, in certain instances a parity section for a fragmented source storage block may be a valid parity section. For example, if a source storage block includes one or more bad word lines that are not included when the parity section for the source storage block is generated and the source storage block includes no invalid data, the parity section may be a valid parity section.

The data section of fragmented source storage blocks SSB1 and SSB4 include invalid data 704 (indicated by the blacked out portions of the logical page) and valid data 706 (indicated by the patterned or open portions of the logical page). "Valid data" refers to data of a data block that was stored by a host or other user of a storage device, and should be preserved and maintained until the host indicates that the data of the data block is no longer needed, and either can, or should be, deleted. "Invalid data" refers to data stored in a storage block that a host has affirmatively deleted or has indicated is no longer needed or can be deleted because the data has been superseded by a new or changed version of the data. In non-volatile storage media comprising storage cells that are write once storage media, if data is modified by a host, the modified version of the data causes the original data stored in the write once storage media to become invalid data, the data is invalidated because it no longer represents a current version of the data.

For source storage blocks having holes of invalid data 704 within logical pages interspersed among valid data 706, such as SSB1 and SSB4, the valid data and appropriate XOR parity data may be used for the on chip folding while some data (e.g., a relatively small percentage, referred to herein as differential data) may be transferred to storage controller 302 to calculate, revise, or generate certain XOR parity data. Certain embodiments avoid including invalid data 704 in the destination storage block 702.

In the illustrated example, various steps may be taken by a storage controller to manage fragmented source storage blocks such that the data blocks stored in the destination storage block are valid data and that the parity sections accurately correlate to the data of the destination storage block. Turning to FIG. 7, suppose the valid data 706 of SSB4 is sufficient to replace the invalid data 704 of SSB1. The parity sections may be managed in a couple of ways. In a first method, the differential data may include the valid data 706 from SSB4 and the parity section, Parity 1 from SSB1. The storage controller may then XOR the valid data 706 with the parity section, Parity 1 to create Parity 1'. Parity 1' may be used in the destination storage block.

In a second method, the storage controller may reverse XOR the invalid data 704 of SSB4 and parity section, Parity 4 to generate revised Parity 4, denoted Parity 4'. Next, the storage controller may reverse XOR the invalid data 704 of SSB1 and parity section, Parity 1 to generate revised Parity 1, denoted Parity 1'. Next, the storage controller may XOR Parity 1' and Parity 4' to generate a resulting parity section that will be storage in the destination storage block. FIG. 7 illustrates this second method.

The storage controller may direct that valid data from SSB4 be used to replace holes caused by invalid data in SSB1. Thus, the storage controller may direct that parity section, Parity 1 be transferred to the storage controller and XORed with the valid replacement data from SSB4 to generate modified Parity 1, identified by Parity 1'.

Advantageously, the embodiments re-use parity sections as much as possible. Certain XOR parity data along with other data (together referred to as differential data) may be processed for re-use in the destination storage block 702. In such a case, the differential data may be brought to XRAM 306 of the storage controller 302 for parity processing/generation. The invalid data 704 may also be brought to XRAM 306 of the storage controller 302 for parity calculation using a deXOR operation.

In one embodiment, a non-volatile memory device 300 or storage controller may perform these steps:

1. The storage controller 302 may identify source storage blocks to be folded based on certain criteria, which may include whether or not a source storage block includes invalid data or a certain percentage of invalid data.
2. The storage controller 302 may instruct one or more memory die to fold logical pages from data sections and parity bins (parity rows and/or parity sections) of complete source storage blocks (such as SSB0, SSB2, and SSB3) into the destination storage block 702 using an on-chip copy operation 708. The storage controller 302 may transfer only differential data from non-volatile memory 308 to XRAM 306 on the storage controller 302 and transfer certain XOR parity data back to the non-volatile memory 308. Handling of differential data for a folding or combining operation 700 is referred to herein as a copy-through-controller operation 710.
3. Valid data from fragmented source storage blocks or a filler storage block may be brought to XRAM 306 of the storage controller 302, and XOR parity data may be regenerated for this data using an XOR operation.
4. Invalid data from fragmented source storage blocks may be brought to XRAM 306 of the storage controller 302 and XOR parity data may be regenerated for this data using a deXOR operation.
5. The modified XOR parity data may be stored to the destination storage block 702.

In embodiments, in which source storage blocks include multiple parity sections (to reduce the failure recovery time for critical blocks) or an unusable region, the storage controller 302 initiate an on-chip copy operation 708 data and only transfer the XOR parity data that needs to be modified to XRAM 306 with modified XOR parity data generated by XORing the relevant parity bins.

If a bad word line includes some valid data and the XOR parity data of the source storage block contains references to the valid data, then XOR parity data of the source storage block may first be modified using the recovered data. This modified XOR parity data may be used to generate the modified XOR parity data in destination storage block. For example, if the recovered data is used from SSB1, the same source parity section may be reused. Otherwise, the XOR parity data may be generated with differential data using a reverse XOR operation and an XOR operation.

By using the efficient parity management during on chip folding, the source parity bins may be used to provide the same immunity from errors to destination storage blocks as source storage blocks. The disclosed solution may also be useful in handling blocks with partial data where the invalid data in a source storage block is identified and used to modify the source XOR parity data. The XOR parity data may be regenerated for differential data, and the parity regeneration may not be needed for the valid data in source blocks. The valid data may be folded using an on-chip copy operation. This may provide faster folding time and improved performance.

FIG. 8A illustrates a complete source storage block 800a. The complete source storage block 800a comprises a data section 802 and a parity section 804, as shown. "Valid parity section" refers to a parity section that includes XOR parity data generated exclusively using data that is presently identified as valid data.

In one embodiment, a valid parity section includes parity bins that each include XOR parity data generated exclusively using data that is presently identified as valid data.

In certain embodiments, an invalid parity section may be converted into a valid parity section by performing a reverse XOR operation on the invalid parity section using the invalid data used to generate the invalid parity section.

FIG. 8B illustrates a fragmented source storage block 800b that includes holes 810. The data section 806 may have holes 810. Holes 810 may be sections of logical pages that include data blocks of invalid data. If a parity section includes XOR parity data generated from data that has become invalid data, the XOR parity data is dependent on the invalid data in order to serve as useable XOR parity data. Because the parity section 808 depends on data that is now invalid, the parity section 808 is also invalid, a referred to as an invalid parity section.

"Invalid parity section" refers to a parity section that includes XOR parity data generated using data that is presently identified as invalid data. The invalid data may have become invalid data due to an update to data for the LBA associated with the data block or the invalid data may be data in word lines that previously held valid data but presently hold invalid data because the word lines are now identified as bad word lines.

FIG. 8C illustrates a source storage block having failed word lines 800c. The source storage block having failed word lines 800c is one type of fragmented source storage block.

The data section 812 of the source storage block having failed word lines 800c may contain failed word lines 816 that have experienced failure during device operation. In one embodiment, the failed word lines 816 have failed such that the whole logical page that includes the failed word lines 816 is also failed, and is un-useable.

Because the parity section 814 was generated using data in the failed word lines 816, the parity section 814 is an invalid parity section.

In contrast to the source storage block having failed word lines 800c of FIG. 8C, FIG. 8D illustrates a source storage block with known bad word lines 800d. The source storage block with known bad word lines 800d is one type of fragmented source storage block. "Bad word line" refers to a word line that is not available for use to read or write data to storages cells, memory cells of the word line. A bad word line may refer to a single physical word line (a physical page) or a plurality of physical word lines (physical page), that together form a logical word line, logical page. Thus, depending on the context bad word line may refer to a bad physical page and/or bad logical page.

There are a number of reasons, causes, or circumstances that may result in a word line being marked, tracked, or otherwise identified as a bad word line. For example, a word line may have an electrical short between a structure of the word line and another structure in a non-volatile memory array. In another example, the memory cells of a word line may be worn to the point that the word line can no longer be reliably used to store and read data. Said another way, a bad word line may have too many errors to be useable, or may have been retired from further use, or may have failed. Alternatively, or in addition, memory cells of a word line may have such poor performance that the word line can no longer be used and still need operating performance requirements or expectations.

Bad word lines may be designated as such when a non-volatile memory array is manufactured and/or as word lines become bad word lines as the word lines are used. In certain embodiments, The data section 818 of the source storage block with known bad word lines 800d may include one or more known bad word lines 822 as shown, that may be identified at the time a memory die or device is manufactured. These known bad word lines 822 may be marked or flagged to exclude them from data storage. As a result, the parity section 820 for this source storage block with known bad word lines 800d includes XOR parity data that does not relate to, or depend on, data stored in the known bad word lines 822. Therefore, the parity section 820 is a valid parity section, provided there is no invalid data in other logical pages of the data section 818.

In certain embodiments, a fragmented source storage block, such as source storage block with known bad word lines 800d, may include one or more known bad word lines 822 and a valid parity section. Differential data that involves the fragmented source storage block then may comprise the valid parity section of the fragmented source storage block having the known bad word line. In such an embodiment, provided the data section 818 does not include invalid data, both the data section 818 (excluding the known bad word lines 822) and the parity section 820 may be used in a folding or combining operation 700 in which the source storage block with known bad word lines 800d is copied using an on-chip copy operation 708.

FIG. 8E illustrates generation of a whole source storage block 800e in accordance with one embodiment. In conventional folding operations, data sections from source storage blocks is transferred from the non-volatile memory 308 to the storage controller such that new XOR parity data can be calculated and stored in the destination storage block. Such folding operations are inefficient because certain XOR parity data that could be re-used is unnecessarily regenerated. FIG. 8E illustrates one embodiment, that more efficiently provides XOR parity data for the destination storage block. The embodiments, described herein use differential data to determine the correct XOR parity data for the destination storage block.

"Differential data" refers to data used to convert an invalid parity section into a valid parity section. Based on the actions to be done to convert a fragmented source storage block into a whole source storage block, the differential data may include a number of different types of data. For example, in one embodiment, the differential data may include invalid data from a fragmented source storage block, an invalid parity section from the same fragmented source storage block, a valid parity section, and fill data that will be stored in a whole source storage block resulting from the fragmented source storage block.

The disclosed embodiments, may use whole source storage blocks that are generated based on one or more existing fragmented source storage blocks. Advantageously, the disclosed embodiments may determine whole source storage blocks while only transferring differential data to the storage controller 302 and then only sending appropriate XOR parity data from the storage controller 302 to the appropriate non-volatile memories 308. In other words, a majority of the data of the data section and/or XOR parity data (e.g., parity rows or parity bins) may remain within the non-volatile memories 308 and a minimal amount of data may experience a copy-through-controller operation.

"Whole source storage block" refers to a source storage block formed by combining a fragmented source storage block, fill data, and a valid parity section where the fill data is of a sufficient quantity to replace invalid data within the fragmented source storage block.

It is desirable for each logical page of the destination storage block to store complete and valid data. Therefore, the disclosed embodiments generate whole source storage blocks that include the same amount of data as complete source storage blocks. To account for holes 810 and bad word lines and known bad word lines 822, the disclosed embodiments combine fill data from a filler storage block with the space used by holes 810 and bad word lines and known bad word lines 822. In this manner, the disclosed embodiments may replace invalid data, data in locations where bad word lines (bad logical pages were) and/or data in locations that were for known bad word lines 822.

"Fill data" refers to one or more data blocks that comprise valid data and are used to replace invalid data within a storage block, such as a fragmented source storage block. Relocating fill data may include updating a physical block address associated with the logical block address for the data block that includes the fill data. "Filler storage block" refers to a storage block that is used as a source for fill data for a merge, combine, or fold operation from source storage blocks to a destination storage block. Filler storage blocks may be a source storage block, a whole source storage block, a complete source storage block, and/or a fragmented source storage block of which the valid data is used as fill data.

Data blocks of a filler storage block that are not used in a current merge, combine, or fold operation may be used for a subsequent current merge, combine, or fold operation and/or may be used in a garbage collection operation that relocates data blocks from existing storage blocks to another storage block.

In one embodiment, the fragmented source storage block 826 may include failed word lines 816 as introduced in FIG. 8C, known bad word lines 822 as introduced in FIG. 8D, and/or holes 810 as introduced in FIG. 8B. Consequently, the parity section for the fragmented source storage block 826 may be an invalid parity section 838. Logic, such as in the storage controller 302, may determine a quantity of fill data needed to replace, or augment, known bad word lines 822, failed word lines 816, and/or holes 810. The logic may identify one or more filler storage blocks 824 and the fill data 832 to be used within each. In certain embodiments, the filler storage block 824 is a fragmented source storage block designated to serve as a filler storage block 824. Alternatively, or in addition, the filler storage block 824 may be a complete source storage block until fill data is used from the complete source storage block or another whole source storage block.

The fill data 832 from the filler storage block 824 may be used to fill in the holes and gaps from invalid data or erroneous or unused parts of a fragmented source storage block, resulting in the valid data 834 stored in the whole source storage block 828. As described in more details below, in certain embodiments a storage controller, processes differential data 830 to generate a valid parity section 836 used with valid data from the fragmented source storage block 826 and the filler storage block 824 to produce the whole source storage block 828.

In certain embodiments, a storage controller 302 may issue instructions to a single non-volatile memory 308 or to one or more non-volatile memories 308 such that once the instructions are followed a whole source storage block 828 is generated and is folded into a destination storage block. In another embodiment, the storage controller 302 may construct the whole source storage block 828 in a scratch memory or other storage block which then may serve as the source storage block for a folding or combining operation 700.

Figure 9:
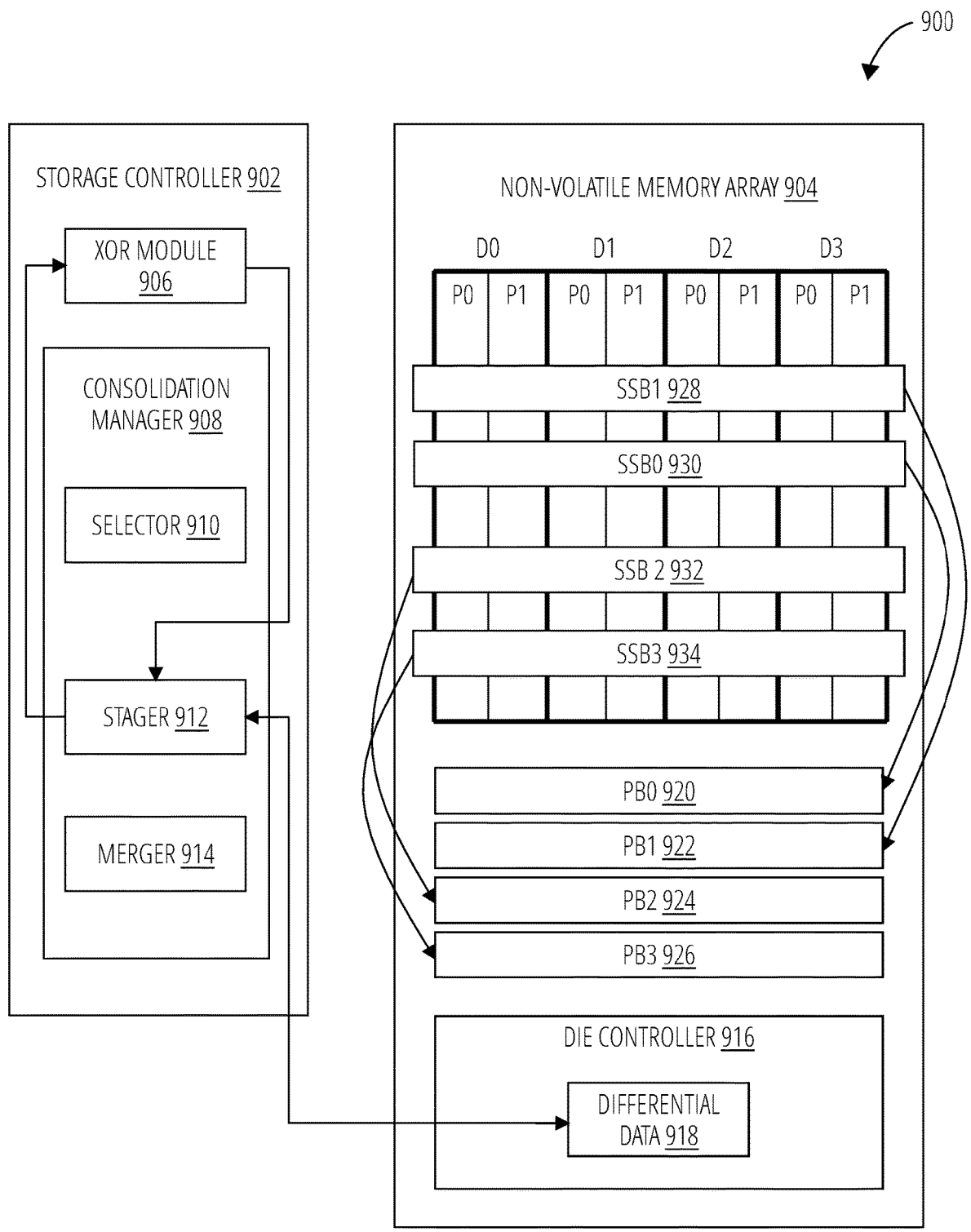
FIG. 9 illustrates a storage device 900 in accordance with one embodiment.

FIG. 9 illustrates a storage device 900 in accordance with one embodiment. The storage device 900 comprises a storage controller 902 and a non-volatile memory array 904. The storage controller 902 may include an XOR module 906, a consolidation manager 908, a selector 910, a stager 912, and a merger 914. The non-volatile memory array 904 may include a die controller 916 configured to manage differential data 918, a page buffer 0 920, a page buffer 1 922, a page buffer 2 924, and a page buffer 3 926. The page buffers may temporarily store data from source storage block 1 928, a source storage block 0 930, a source storage block 2 932, and a source storage block 3 934 as shown in implementing the disclosed solution.

The non-volatile memory array 904 may comprise multiple memory die (e.g., D0-D3), each having one or more planes (e.g., P0-P1). The non-volatile memory array 904 may comprise a plurality of storage blocks comprising word lines (i.e., logical pages) organized into strings of logical pages that span the memory die, as described with respect to FIG. 4. Each storage block, such as source storage block 1 928, source storage block 0 930, source storage block 2 932, and source storage block 3 934, may be configured to store one or more logical pages within each string.

The consolidation manager 908 of the storage controller 902 may combine logical pages from source storage blocks of the non-volatile memory array 904 into a destination storage block of the non-volatile memory array 904, such that more data of the source storage blocks is copied to the destination storage block by way of an on-chip copy (OCC) operation than the data copied to the destination storage block by way of a copy-through-controller (CTC) operation. "Consolidation manager" refers to any hardware, software, firmware, circuit, component, module, logic, device, or apparatus configured, programmed, designed, arranged, or engineered to combine two or more storage blocks into a single destination storage block.

The consolidation manager 908 may be configured to combine source storage blocks (by combining logical pages from one or more of them) into the destination storage block such that one or more parity sections are reused in the destination storage block without modification. In certain embodiments, this means that the reused one or more parity sections may stay within a memory die that stores the data sections associated with the parity sections. In addition, the destination storage block includes parity sections that enable recovery of physical pages resulting from word line to word line shorts within a single plane and recovery of a logical page in response to a logical page read failure.

The consolidation manager 908 may include a selector 910. "Selector" refers to any hardware, software, firmware, circuit, component, module, logic, device, or apparatus configured, programmed, designed, arranged, or engineered to identify or select one or more storage blocks for use as source storage blocks for combining the data of the source storage blocks into a destination storage block. The selector may choose from one or more complete source storage blocks, one or more fragmented source storage blocks, and/or one or more whole source storage blocks.

The selector 910 may be configured to determine a plurality of source storage blocks for combining into the destination storage block. Each source storage block may comprise memory cells organized into a data section and a parity section. The parity section may store XOR parity data configured to enable data recovery of physical pages of a source storage block.

The consolidation manager 908 may further comprise a stager 912 configured to convert fragmented source storage blocks of the plurality of source storage blocks into whole source storage blocks. "Stager" refers to any hardware, software, firmware, circuit, component, module, logic, device, or apparatus configured, programmed, designed, arranged, or engineered to convert, manipulate, or configure a fragmented source storage block to form a whole source storage block from at least a portion of the fragmented source storage block. In one embodiment, the stager is configured such that a majority of data of the fragmented source storage block is not differential data and remains on memory die of a non-volatile memory array as part of forming the whole source storage block.

The consolidation manager 908 may include a merger 914 configured to merge one or more whole source storage blocks with one or more source storage blocks of the plurality of source storage blocks into the destination storage block. "Merger" refers to any hardware, software, firmware, circuit, component, module, logic, device, or apparatus configured, programmed, designed, arranged, or engineered to generate a destination storage block based on two or more source storage blocks. In one embodiment, the merger may combine, merge, or fold data from source storage blocks into a destination storage block. In another embodiment, the merger may instruct, direct, command, and/or orchestrate the actions of other circuits, components, devices, or systems in order to generate the destination storage block.

For example, in a non-volatile storage device, the merger may be implemented in a storage controller and all except the differential data may remain on a non-volatile memory array, and the merger may direct memory die of the non-volatile memory array to combine data from a plurality of source storage blocks to form a destination storage block within the non-volatile memory array.

In general, the source storage blocks will include one or more fragmented source storage blocks. Thus, in one embodiment, merging the plurality of source storage blocks may further comprise converting fragmented source storage blocks of the plurality of source storage blocks into whole source storage blocks. The consolidation manager 908 may then merge whole source storage blocks with one or more source storage blocks of the plurality of source storage blocks into the destination storage block.

As described above, converting fragmented source storage blocks into whole source storage blocks may involve processing of differential data 918. In one embodiment, the stager 912 may convert the fragmented source storage blocks by separating invalid data from the valid data of the fragmented source storage blocks and by separating, or identifying, one or more invalid parity sections from valid parity sections. The invalid data and invalid parity sections may be part of differential data 918 used in the preparation a plurality of source storage blocks for the folding or combining operation 700.

Advantageously, valid data and valid parity sections may remain on the non-volatile memories 308 and the invalid data and invalid parity sections (also referred to herein as differential data 918) may be transferred to the storage controller 902. In other words, the stager 912 may send instructions for transfer of invalid data and/or invalid parity sections to the storage controller 902 but retain the valid data and valid parity sections on the non-volatile memories 308. In certain embodiments, the stager 912 retains the valid data and valid parity sections on the non-volatile memories 308 by not sending instructions to transfer this data to the storage controller 902.

In certain situations, the stager 912 may also transfer certain valid data to the storage controller 902. For example, fill data is valid data and is part of the differential data 918 transferred to the storage controller 902 in order to generate the parity row(s) for the whole source storage block. In certain embodiments, the differential data 918 may include valid parity sections that may be XORed with another valid parity section (such as one generated from an invalid parity section) in order to generate a valid parity section representative of two source storage blocks that are to be folded into the destination storage block.

The stager 912 may determines how to convert fragmented source storage blocks into whole source storage blocks and may perform the conversion. In one embodiment, the stager 912 determines which fill data from a filler storage block to substitute for invalid data of the fragmented source storage blocks. This substitution may include changing logical-to-physical data block addresses maintained by the storage controller 902 such that the LBAs will point to the new physical location of a data block in the destination storage block.

In one embodiment, the stager 912 cooperates with the XOR module 906 to prepare XOR parity data for use in the destination storage block. Specifically, if the differential data comprises an invalid parity section, or an invalid parity row from a parity section, and the invalid data that is associated with the invalid parity section, or an invalid parity row, the stager 912 may send the invalid data and the associated XOR parity data (from the invalid parity section, one or more parity bins, or the invalid parity row) to the XOR module 906. The XOR module 906 may perform a reverse XOR operation on the XOR parity data and the invalid data which changes the XOR parity data such that the XOR parity data no longer is associated, related, or dependent on the invalid data. In one sense, the reverse XOR operation changes the XOR parity data such that an invalid parity section or invalid parity row becomes a valid parity section or valid parity row. An invalid parity section is converted into a valid parity section.

In addition, the stager 912 may send valid data (such as fill data or data from a fragmented source storage block having known bad word lines 822) and a valid parity section to the XOR module 906 such that the resulting parity section incorporates, accounts for, and/or is dependent on the valid data. In this manner, the stager 912 may generate valid parity sections based on the fill data. The valid parity sections account for the fill data. Valid parity sections may be generated in one embodiment by converting invalid parity sections into valid parity sections using the invalid data, and/or by modifying the valid parity sections to account for the fill data.

In one embodiment, the stager 912 transfers valid parity sections and/or fill data from the storage controller to the memory die. In one embodiment, the fill data may be transferred to the storage controller for generating of valid parity sections, however the fill data may not be transferred back to the memory die, but a copy of fill data already stored on the memory die may be reused instead.

The stager 912 may directly generate whole source storage blocks or operate using differential data and send instructions to the memory die to re-organize data blocks in order to form whole source storage blocks that are used in a folding or combining operation 700. The stager 912 may combine valid data and fill data and/or valid parity sections to generate whole source storage blocks.

In one embodiment, the stager 912 communicates with the merger 914 to generate or identify the whole source storage blocks and the merger 914 may send instructions to one or more memory die to merge the whole source storage blocks into the destination storage block.

In one embodiment, the stager 912 and/or merger 914 communicate with the memory die (e.g., with the die controller 916) to perform an on-chip copy operation. In one embodiment, the on-chip copy operation may comprise iteratively copying logical pages from one or more source storage blocks, such as source storage block 1 928, source storage block 0 930, source storage block 2 932, and source storage block 3 934, into memory buffers, or page buffers, on the chip. Once the data for a new multi-level cell logical page of a destination storage block is in the memory buffers or page buffers of the chip, the die controller 916 may merge the data of the multiple page buffers into a single logical page of the destination storage block.

For example, where the source storage blocks comprise single level cell logical pages and the destination storage block is a QLC storage block, the merger 914 may instruct the die controller 916 to move four logical pages from one, two, three, or four different source storage blocks (e.g., source storage block 1 928, source storage block 0 930, source storage block 2 932, and source storage block 3 934) into page buffer 0 920, page buffer 1 922, page buffer 2 924, and page buffer 3 926. Next, the die controller 916 may store the data from page buffer 0 920, page buffer 1 922, page buffer 2 924, and page buffer 3 926 within a single logical page of the destination storage block (not shown). The merging or folding or combining operation 700 may be iteratively completed using each logical page of the data sections and parity sections from the source storage blocks.

Figure 10:
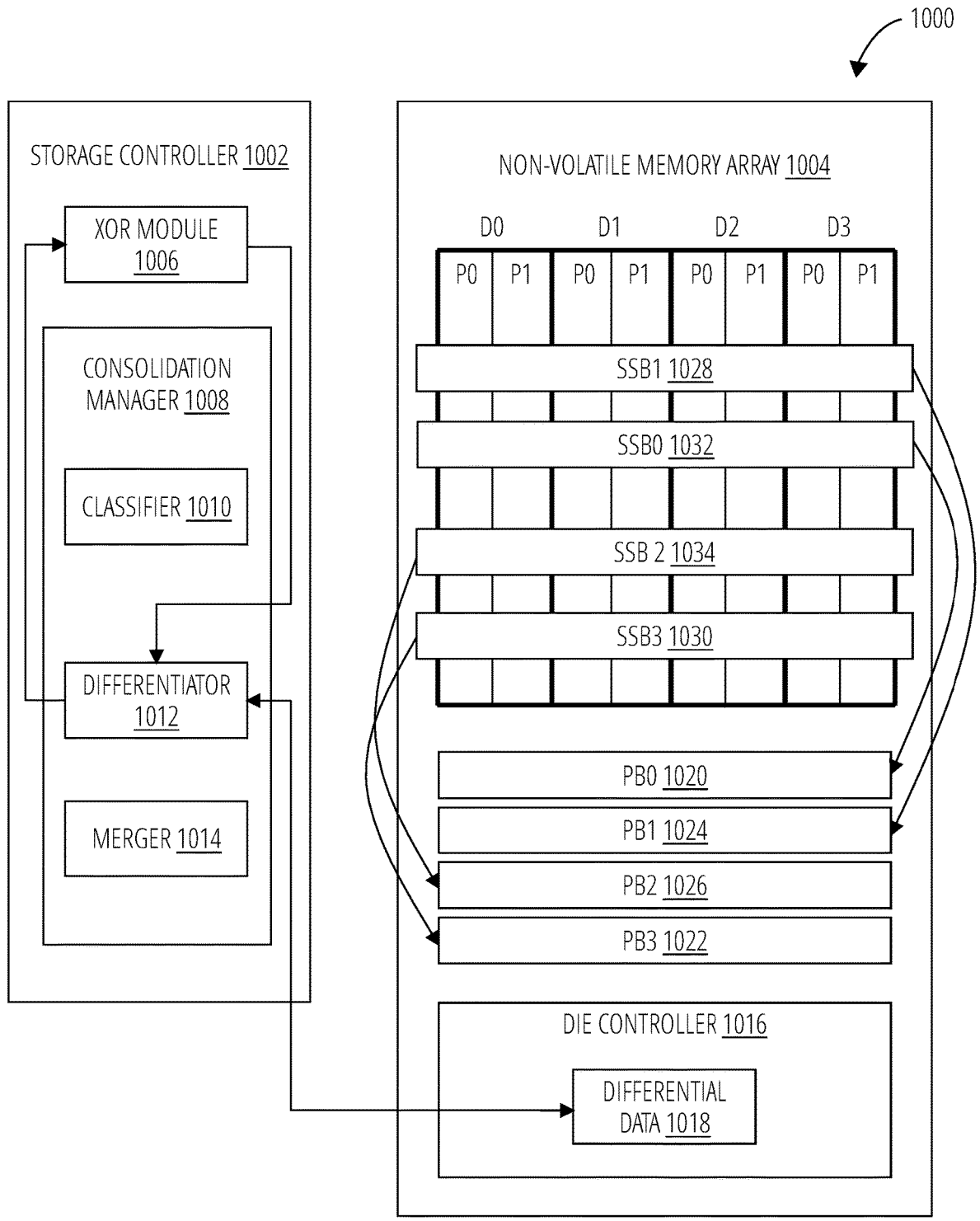
FIG. 10 illustrates a storage device 1000 in accordance with one embodiment.

FIG. 10 illustrates a storage device 1000 in accordance with one embodiment. The storage device 1000 comprises a storage controller 1002 and a non-volatile memory array 1004. The storage controller 1002 may include an XOR module 1006, a consolidation manager 1008, a classifier 1010, a differentiator 1012, and a merger 1014. The non-volatile memory array 1004 may further include a die controller 1016 capable of handling differential data 1018, a page buffer 0 1020, a page buffer 1 page buffer 3 1022, a page buffer 2 page buffer 1 1024, and a page buffer 3 page buffer 2 1026. The page buffers may handle data from a source storage block 1 1028, a source storage block 3 1030, a source storage block 0 1032, and a source storage block 2 1034 as shown in implementing the disclosed solution.

The non-volatile memory array 1004 and its constituent components may operate and function in similar manner to like components described and illustrated in FIG. 9.

The non-volatile memory array 1004 may comprise multiple memory die, each having one or more planes. The non-volatile memory array 1004 may comprise a plurality of storage blocks comprising word lines organized into strings that comprise logical pages that span the memory die, as described with respect to FIG. 4. Each storage block, such as source storage block 1 1028, source storage block 3 1030, source storage block 0 1032, and source storage block 2 1034, may be configured to store one or more logical pages within each string.

The XOR module 1006 and merger 1014 and their constituent components may operate and function in similar manner to like components described and illustrated in FIG. 9.

In the illustrated embodiment, the consolidation manager 1008 may include a classifier 1010 and a differentiator 1012 that cooperate to efficiently fold logical pages from source storage blocks into a destination storage block.

"Classifier" refers to any hardware, software, firmware, circuit, component, module, logic, device, or apparatus configured, programmed, designed, arranged, or engineered to distinguish fragmented source storage blocks from other storage blocks in a non-volatile memory array. The classifier 1010 of the consolidation manager 1008 may identify fragmented source storage blocks within a plurality of source storage blocks intended to be combined into a destination storage block. The parity section may comprise XOR parity data configured to enable data recovery of physical pages of a source storage block.

The differentiator 1012 of the consolidation manager 1008 may request differential data 1018 associated with the identified fragmented source storage blocks. In one embodiment, the fragmented source storage block includes bad word lines and a valid parity section. In such an embodiment, the differential data may include the valid parity section of the fragmented source storage block with the bad word line. "Differentiator" refers to any hardware, software, firmware, circuit, component, module, logic, device, or apparatus configured, programmed, designed, arranged, or engineered to manage differential data and define a whole source storage block that includes fill data and a valid parity section associated with a fragmented source storage block.

The differentiator 1012 may transfer the differential data 1018 from the non-volatile memory array 1004 to the storage controller 1002. The differential data 1018 may comprise one or more of invalid data, fill data, and one or more invalid parity sections. The differentiator 1012 may convert the one or more invalid parity sections of the differential data 1018 into valid parity sections for whole source storage blocks configured to include the fill data. The whole source storage blocks may replace the fragmented source storage blocks within the plurality of source storage blocks. The differentiator 1012 may then transfer the valid parity sections to the non-volatile memory array 1004. The merger 1014 may direct the plurality of memory die of the non-volatile memory array 1004 to merge the plurality of source storage blocks into the destination storage block.

In one embodiment, valid data for the source storage blocks may remain in the non-volatile memory array 1004 and the differential data 1018 may be transferred to the storage controller 1002. The differentiator 1012 may identify a filler storage block within the plurality of storage blocks and transfer fill data from the filler storage block as part of the differential data 1018. The filler storage block may be stored on the same memory die as the source storage blocks and/or destination storage block. A single filler storage block may be used for one or more folding or combining operation 700. In one embodiment, the quantity of valid data and one or more valid parity sections retained on the memory die may exceed the quantity of the invalid data, fill data, and invalid parity sections.

The plurality of source storage blocks may comprise a first source storage block. Merging the plurality of source storage blocks into the destination storage block may in this case comprise transferring a data section and a parity section of the first source storage block from a non-volatile memory array of a memory die to a plurality of page buffers within the memory die, such as page buffer 0 1020, page buffer 1 1024, page buffer 2 1026, and page buffer 3 1022.

"Page buffer" refers to any circuit, sub-circuit, electronic component, hardware, software, firmware, module, logic, memory, volatile memory, device, or apparatus configured, programmed, designed, arranged, or engineered to temporarily store a data value.

In one embodiment, a non-volatile memory array includes one or more page buffers implemented as latches, electronic circuits, that store a data value sensed by sense amplifiers coupled to bit lines of the non-volatile memory array. In certain embodiments, a page buffer may include a latch for each bit line along a row (a physical page or logical page) such that the memory cells of a physical page or logical page are sensed/read into the page buffer in a single read/sense operation for the memory die.

For a non-volatile memory array having memory cells configured to store more than one bit per memory cell, the non-volatile memory array may include a separate page buffer for each bit that the memory cells are storing. (e.g., a QLC non-volatile memory array may include four page buffers).

Fill data and a valid parity section for a whole source storage block may be transferred from a storage controller 1002, and valid data and zero or more valid parity sections from the non-volatile memory array 1004 may be transferred to at least one page buffer within the memory die. The destination storage block may be programmed by combining the first source storage block and the whole source storage block such that data for multiple storage blocks is stored in memory cells of the destination storage block.

Figure 11:
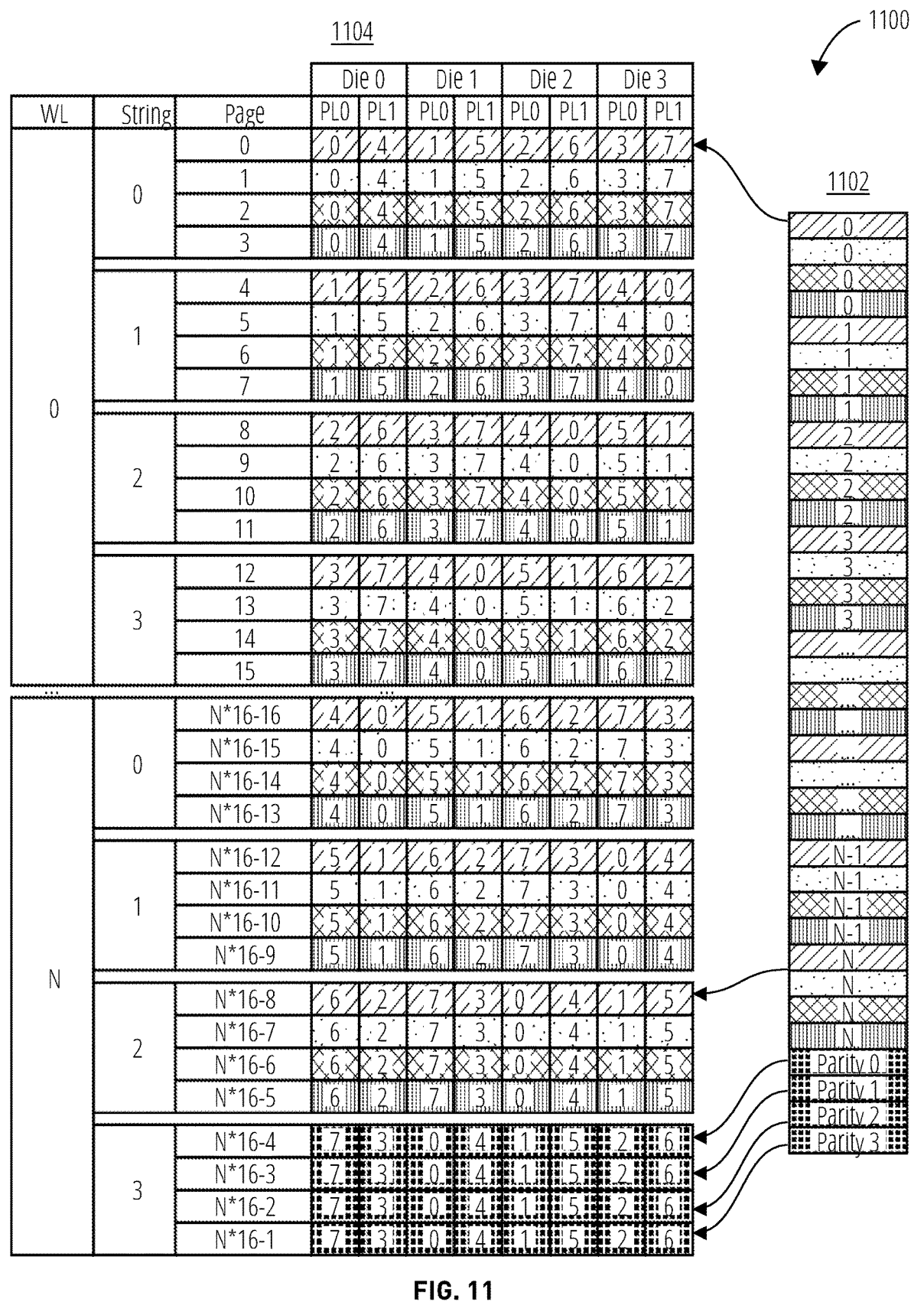

FIG. 11 illustrates a QLC storage block with XOR parity bin protection 1100 in accordance with one embodiment. A destination storage block 1102 is illustrated, along with the first and final word lines of its corresponding parity bin map 1104.

The XOR parity data within the parity section of the destination storage block 1102 may be configured according to a parity bin map 1104 configured to enable recovery of a logical page of a data section of the destination storage block 1102 in response to a read error of the logical page, and recovery of a physical page in response to a word line to word line short within a single plane. Those of skill in the art will recognize that word line to word line shorts and read errors for other kinds of errors, such as dual plane failure may be supported in different embodiments of the disclosed solution by including added XOR parity data and/or revising the parity bin map 1104.

"Read error" refers to an error condition in which when data of a logical page is read the read data includes too many errors to practically use the read result. Typically, in response to a read error remediation operations are initiated to re-create, recovery, or determine appropriate data values for the data of a logical page that experiences the read error.

Figure 12:
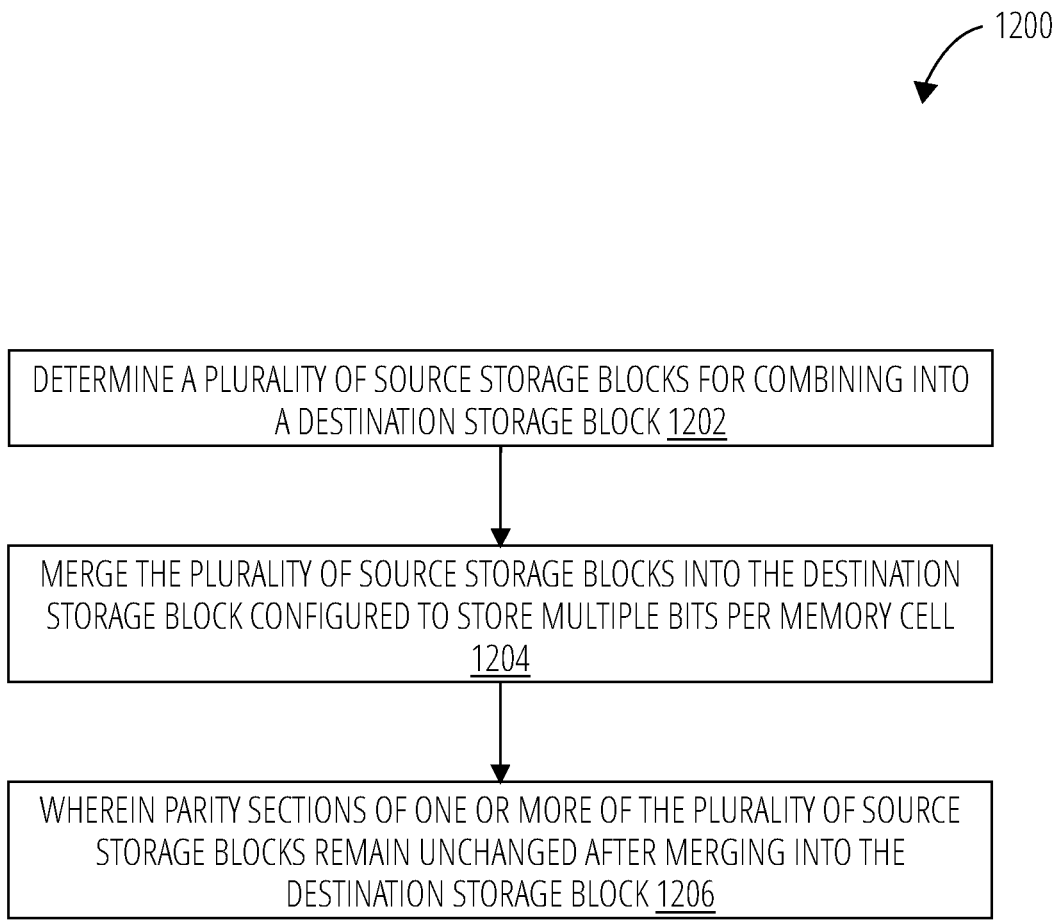
FIG. 12 illustrates a method 1200 in accordance with one embodiment.

FIG. 12 illustrates a method 1200 for on-chip parity buffer management for storage block combining in non-volatile memory. At block 1202, multiple source storage blocks are selected to be combined into a storage destination storage block. Each source storage block comprises memory cells organized into a data section and a parity section. The parity section comprises XOR parity data configured to enable data recovery of physical pages of the source storage block.

At block 1204, the plurality of source storage blocks is merged into the destination storage block, which is configured to store multiple bits per memory cell. At block 1206, parity sections of one or more of the plurality of source storage blocks may remain unchanged after merging into the destination storage block.

In some embodiments, a first source storage block may include one of a complete source storage block and a whole source storage block. The destination storage block may include four or more bits per cell.

Figure 13:
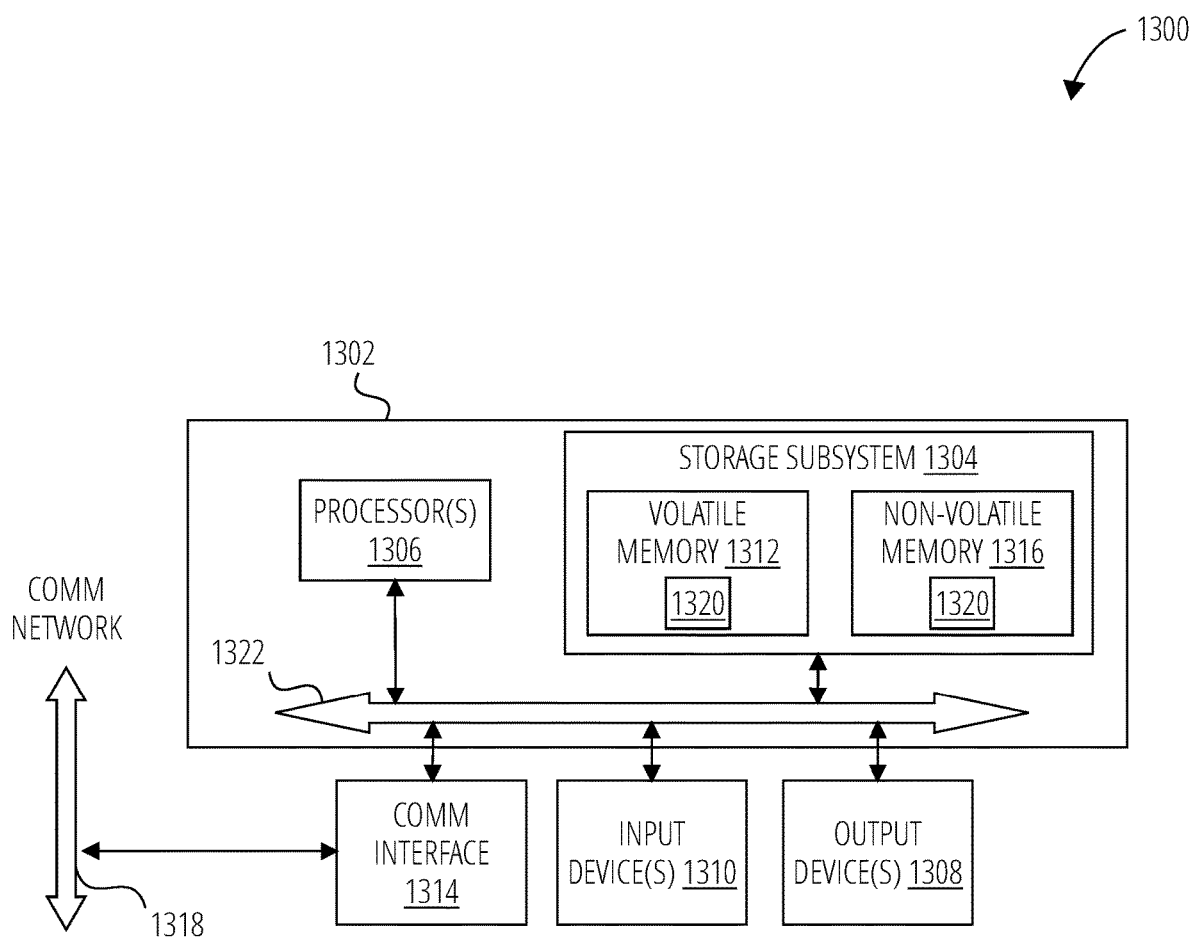
FIG. 13 is an example block diagram of a computing device 1300 that may incorporate certain embodiments.

FIG. 13 is an example block diagram of a computing device 1300 that may incorporate embodiments of the solution. FIG. 13 is merely illustrative of a machine system to carry out aspects of the technical processes described herein and does not limit the scope of the claims. One of ordinary skill in the art would recognize other variations, modifications, and alternatives. In certain embodiments, the computing device 1300 includes a data processing system 1302, a communication network 1318, communication network interface 1314, input device(s) 1310, output device(s) 1308, and the like.

As depicted in FIG. 13, the data processing system 1302 may include one or more processor(s) 1306 and a storage subsystem 1304. "Processor" refers to any circuitry, component, chip, die, package, or module configured to receive, interpret, decode, and execute machine instructions. "Instructions" refers to symbols representing commands for execution by a device using a processor, microprocessor, controller, interpreter, or other programmable logic. Broadly, 'instructions' can mean source code, object code, and executable code. "Instructions" herein is also meant to include commands embodied in programmable read-only memories (EPROM) or hard coded into hardware (e.g., "micro-code") and like implementations wherein the instructions are configured into a machine read-only memory or other hardware component at manufacturing time of a device. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor core, and the like.

The processor(s) 1306 communicate with a number of peripheral devices via a bus subsystem 1322. These peripheral devices may include input device(s) 1310, output device(s) 1308, communication network interface 1314, and the storage subsystem 1304. The storage subsystem 1304, in one embodiment, comprises one or more storage devices and/or one or more memory devices.

"Storage device" or "memory device" refers to any hardware, system, sub-system, circuit, component, module, non-volatile memory media, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a Solid-State storage device, Just a Bunch Of Disks (JBOD), Just a Bunch Of Flash (JBOF), an external hard disk, an internal hard disk, and the like.

"Non-volatile memory media" refers to any hardware, device, component, element, or circuit configured to maintain an alterable physical characteristic used to represent a binary value of zero or one after a primary power source is removed. Examples of the alterable physical characteristic include, but are not limited to, a threshold voltage for a transistor, an electrical resistance level of a memory cell, a current level through a memory cell, a magnetic pole orientation, a spin-transfer torque, and the like.

The alterable physical characteristic is such that, once set, the physical characteristic stays sufficiently fixed such that when a primary power source for the non-volatile memory media is unavailable the alterable physical characteristic can be measured, detected, or sensed, when the binary value is read, retrieved, or sensed. Said another way, non-volatile memory media is a storage media configured such that data stored on the non-volatile memory media is retrievable after a power source for the non-volatile memory media is removed and then restored. Non-volatile memory media may comprise one or more non-volatile memory elements, which may include, but are not limited to: chips, packages, planes, memory die, and the like.

Examples of non-volatile memory media include but are not limited to: ReRAM, Memristor memory, programmable metallization cell memory, phase-change memory (PCM, PCME, PRAM, PCRAM, ovonic unified memory, chalcogenide RAM, or C-RAM), NAND FLASH memory (e.g., 2D NAND FLASH memory, 3D NAND FLASH memory), NOR FLASH memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like.

While the non-volatile memory media is referred to herein as "memory media," in various embodiments, the non-volatile memory media may more generally be referred to as non-volatile memory. Because non-volatile memory media is capable of storing data when a power supply is removed, the non-volatile memory media may also be referred to as a recording media, non-volatile recording media, storage media, storage, non-volatile memory, volatile memory medium, non-volatile storage medium, non-volatile storage, or the like.

In certain embodiments, data stored in non-volatile memory media is addressable at a block level which means that the data in the non-volatile memory media is organized into data blocks that each have a unique logical address (e.g., LBA). In other embodiments, data stored in non-volatile memory media is addressable at a byte level which means that the data in the non-volatile memory media is organized into bytes (8 bits) of data that each have a unique address, such as a logical address. One example of byte addressable non-volatile memory media is storage class memory (SCM).

In one embodiment, the storage subsystem 1304 includes a volatile memory 1312 and a non-volatile memory 1316. The volatile memory 1312 and/or the non-volatile memory 1316 may store computer-executable instructions that alone or together form logic 1320 that when applied to, and executed by, the processor(s) 1306 implement embodiments of the processes disclosed herein.

"Volatile memory" refers to a shorthand name for volatile memory media. In certain embodiments, volatile memory refers to the volatile memory media and the logic, controllers, processor(s), state machine(s), and/or other periphery circuits that manage the volatile memory media and provide access to the volatile memory media.

"Volatile memory media" refers to any hardware, device, component, element, or circuit configured to maintain an alterable physical characteristic used to represent a binary value of zero or one for which the alterable physical characteristic reverts to a default state that no longer represents the binary value when a primary power source is removed or unless a primary power source is used to refresh the represented binary value. Examples of volatile memory media include but are not limited to dynamic random-access memory (DRAM), static random-access memory (SRAM), double data rate random-access memory (DDR RAM) or other random-access solid-state memory.

While the volatile memory media is referred to herein as "memory media," in various embodiments, the volatile memory media may more generally be referred to as volatile memory.

"Non-volatile memory" refers to shorthand name for non-volatile memory media. In certain embodiments, non-volatile memory media refers to the non-volatile memory media and the logic, controllers, processor(s), state machine(s), and/or other periphery circuits that manage the non-volatile memory media and provide access to the non-volatile memory media.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

The input device(s) 1310 include devices and mechanisms for inputting information to the data processing system 1302. These may include a keyboard, a keypad, a touch screen incorporated into a graphical user interface, audio input devices such as voice recognition systems, microphones, and other types of input devices. In various embodiments, the input device(s) 1310 may be embodied as a computer mouse, a trackball, a track pad, a joystick, wireless remote, drawing tablet, voice command system, eye tracking system, and the like. The input device(s) 1310 typically allow a user to select objects, icons, control areas, text and the like that appear on a graphical user interface via a command such as a click of a button or the like.

The output device(s) 1308 include devices and mechanisms for outputting information from the data processing system 1302. These may include a graphical user interface, speakers, printers, infrared LEDs, and so on, as well understood in the art. In certain embodiments, a graphical user interface is coupled to the bus subsystem 1322 directly by way of a wired connection. In other embodiments, the graphical user interface couples to the data processing system 1302 by way of the communication network interface 1314. For example, the graphical user interface may comprise a command line interface on a separate computing device 1300 such as desktop, server, or mobile device.

The communication network interface 1314 provides an interface to communication networks (e.g., communication network 1318) and devices external to the data processing system 1302. The communication network interface 1314 may serve as an interface for receiving data from and transmitting data to other systems. Embodiments of the communication network interface 1314 may include an Ethernet interface, a modem (telephone, satellite, cable, ISDN), (asynchronous) digital subscriber line (DSL), Fire-Wire, USB, a wireless communication interface such as Bluetooth or WiFi, a near field communication wireless interface, a cellular interface, and the like.

The communication network interface 1314 may be coupled to the communication network 1318 via an antenna, a cable, or the like. In some embodiments, the communication network interface 1314 may be physically integrated on a circuit board of the data processing system 1302, or in some cases may be implemented in software or firmware, such as "soft modems", or the like.

The computing device 1300 may include logic that enables communications over a network using protocols such as HTTP, TCP/IP, RTP/RTSP, IPX, UDP and the like.

The volatile memory 1312 and the non-volatile memory 1316 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor storage media such as flash memories, non-transitory read-only-memories (ROMS), battery-backed volatile memories, networked storage devices, and the like. The volatile memory 1312 and the non-volatile memory 1316 may be configured to store the basic programming and data constructs that provide the functionality of the disclosed processes and other embodiments thereof that fall within the scope of the present disclosure.

Logic 1320 that implements one or more parts of embodiments of the solution may be stored in the volatile memory 1312 and/or the non-volatile memory 1316. Logic 1320 may be read from the volatile memory 1312 and/or non-volatile memory 1316 and executed by the processor(s) 1306. The volatile memory 1312 and the non-volatile memory 1316 may also provide a repository for storing data used by the logic 1320.

The volatile memory 1312 and the non-volatile memory 1316 may include a number of memories including a main random access memory (RAM) for storage of instructions and data during program execution and a read only memory (ROM) in which read-only non-transitory instructions are stored. The volatile memory 1312 and the non-volatile memory 1316 may include a file storage subsystem providing persistent (non-volatile) storage for program and data files. The volatile memory 1312 and the non-volatile memory 1316 may include removable storage systems, such as removable FLASH memory.

The bus subsystem 1322 provides a mechanism for enabling the various components and subsystems of data processing system 1302 communicate with each other as intended. Although the communication network interface 1314 is depicted schematically as a single bus, some embodiments of the bus subsystem 1322 may utilize multiple distinct busses.

It will be readily apparent to one of ordinary skill in the art that the computing device 1300 may be a device such as a smartphone, a desktop computer, a laptop computer, a rack-mounted computer system, a computer server, or a tablet computer device. As commonly known in the art, the computing device 1300 may be implemented as a collection of multiple networked computing devices. Further, the computing device 1300 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

Corresponding structures for each of the means described above may include any of the structures shown in the drawings and described herein, such as for example, an XOR module that may be implemented using a processor, logic gates, programmable logic, firmware, software or combinations thereof.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

The invention claimed is:

1. A method, comprising:
   determining a plurality of source storage blocks for combining into a destination storage block, each source storage block comprising memory cells organized into a data section and a parity section, the parity section comprising XOR parity data configured to enable data recovery of physical pages of the source storage block;
   merging the plurality of source storage blocks into the destination storage block, wherein the destination storage block is configured to store multiple bits per memory cell; and
   wherein parity sections of one or more of the plurality of source storage blocks remain unchanged after merging into the destination storage block.

2. The method of claim 1, wherein the parity section comprises a parity row having a plurality of parity bins, the parity bins comprising XOR parity data distributed among the plurality of parity bins to enable data recovery of a logical page of a plurality of logical pages within the source storage block associated with the parity section.

3. The method of claim 1, wherein merging the plurality of source storage blocks further comprises:
   converting fragmented source storage blocks of the plurality of source storage blocks into whole source storage blocks; and
   merging the whole source storage blocks with one or more source storage blocks of the plurality of source storage blocks into the destination storage block.

4. A method, comprising:
   determining a plurality of source storage blocks for combining into a destination storage block, each source storage block comprising memory cells organized into a data section and a parity section, the parity section comprising XOR parity data configured to enable data recovery of physical pages of the source storage block;
   merging the plurality of source storage blocks into the destination storage block, wherein the destination storage block is configured to store multiple bits per memory cell, wherein parity sections of one or more of the plurality of source storage blocks remain unchanged after merging into the destination storage block, wherein merging the plurality of source storage blocks further comprises:
   converting fragmented source storage blocks of the plurality of source storage blocks into whole source storage blocks, wherein converting the fragmented source storage blocks comprises:
   separating invalid data from the valid data of the fragmented source storage blocks;
   separating an invalid parity section from valid parity sections of the fragmented source storage blocks;
   retaining valid data and valid parity sections on a memory die storing the plurality of source storage blocks;
   transferring the invalid data and invalid parity sections for the fragmented source storage blocks to a storage controller;
   substituting fill data from a filler storage block for the invalid data of the fragmented source storage blocks;
   generating valid parity sections based on the fill data;
   transferring the valid parity sections and fill data from the storage controller to the memory die; and
   combining the valid data, the fill data, and the valid parity sections to generate the whole source storage blocks; and
   merging the whole source storage blocks with one or more source storage blocks of the plurality of source storage blocks into the destination storage block.

5. The method of claim 4, wherein generating valid parity sections comprises:
   converting invalid parity sections into valid parity section by way of the invalid data; and
   modifying the valid parity sections to account for the fill data.

6. The method of claim 4, wherein the filler storage block comprises a fragmented source storage block.

7. The method of claim 4, wherein a quantity of valid data and one or more valid parity sections retained on the memory die exceeds a quantity of the invalid data, fill data, and invalid parity sections.

8. A method, comprising:
   determining a plurality of source storage blocks for combining into a destination storage block, each source storage block comprising memory cells organized into a data section and a parity section, the parity section comprising XOR parity data configured to enable data recovery of physical pages of the source storage block; and
   merging the plurality of source storage blocks into the destination storage block, wherein the destination storage block is configured to store multiple bits per memory cell, wherein parity sections of one or more of the plurality of source storage blocks remain unchanged after merging into the destination storage block, and of claim 1, wherein the plurality of source storage blocks comprises a first source storage block, and wherein merging the plurality of source storage blocks into the destination storage block comprises:

transferring a data section and a parity section of the first source storage block from a non-volatile memory array of a memory die to a plurality of page buffers within the memory die;

transferring fill data and a valid parity section for a whole source storage block from a storage controller and valid data and zero or more valid parity sections from the non-volatile memory array to at least one page buffer within the memory die; and programing the destination storage block by way of combining the first source storage block and the whole source storage block such that data for multiple storage blocks is stored in memory cells of the destination storage block.

9. The method of claim 8, wherein the first source storage block comprises one of a complete source storage block and a whole source storage block.

10. The method of claim 1, wherein the destination storage block comprises four or more bit per cell.

11. An apparatus, comprising:

a non-volatile memory array comprising a plurality of memory die, the non-volatile memory array including a plurality of storage blocks including word lines organized into strings that include logical pages that span the memory die, each storage block configured to store one or more logical pages within each string; and a storage controller comprising a consolidation manager configured to combine source storage blocks of the non-volatile memory array into a destination storage block of the nonvolatile memory array, wherein a first amount of data of the source storage blocks is copied to the destination storage block by way of an on-chip copy (OCC) operation, wherein a second amount of data of the source storage blocks is copied to the destination storage block by way of a copy-through-controller (CTC) operation, and wherein the first amount of data is greater than the second amount of data.

12. The apparatus of claim 11, wherein the consolidation manager is configured to combine source storage blocks into the destination storage block, wherein one or more parity sections are combined in the destination storage block without modification, and wherein the destination storage block includes parity sections that enable recovery of physical pages resulting from word line to word line shorts and single plane failure and recovery of a logical page in response to a logical page read failure.

13. The apparatus of claim 11, the consolidation manager comprising:

a selector configured to determine a plurality of source storage blocks for combining into the destination storage block, each source storage block comprising memory cells organized into a data section and a parity section, the parity section comprising XOR parity data configured to enable data recovery of physical pages of the source storage blocks;

a stager configured to convert fragmented source storage blocks of the plurality of source storage blocks into whole source storage blocks; and a merger configured to merge one or more whole source storage blocks with one or more source storage blocks of the plurality of source storage blocks into the destination storage block.

14. The apparatus of claim 11, wherein the storage block comprises a data section and a parity section, the parity section comprising one or more parity rows, each parity row comprising a set of parity bins configured to store XOR parity data generated from data of physical pages within the logical pages of the storage block according to a parity bin map.

15. An apparatus, comprising:

a non-volatile memory array comprising a plurality of memory die, the non-volatile memory array comprising a plurality of storage blocks comprising word lines organized into strings that comprise logical pages that span the memory die, each storage block configured to store one or more logical pages within each string; and a storage controller including:

a consolidation manager that includes:

a classifier configured to identify fragmented source storage blocks within a plurality of source storage blocks for combining into a destination storage block, each source storage block comprising memory cells organized into a data section and a parity section, the parity section comprising XOR parity data configured to enable data recovery of physical pages of a source storage block;

a differentiator configured to:

request differential data associated with the identified fragmented source storage blocks;

transfer the differential data from the non-volatile memory array to the storage controller, the differential data comprising one or more of invalid data, fill data, and one or more invalid parity sections;

convert the one or more invalid parity sections of the differential data into valid parity sections for whole source storage blocks configured to include the fill data, the whole source storage blocks configured to replace the fragmented source storage blocks within the plurality of source storage blocks; and transfer the valid parity sections to the non-volatile memory array; and a merger configured to direct the plurality of memory die of the non-volatile memory array to merge the plurality of source storage blocks into the destination storage block.

16. The apparatus of claim 15, wherein valid data for the source storage blocks remains in the non-volatile memory array and the differential data is transferred to the storage controller.

17. The apparatus of claim 15, wherein a fragmented source storage block comprises a bad word line and a valid parity section and wherein the differential data comprises the valid parity section of the fragmented source storage block having the bad word line.

18. The apparatus of claim 15, wherein the differentiator is configured to identify a filler storage block within the plurality of storage blocks and transfer fill data from the filler storage block as part of the differential data.

19. The apparatus of claim 15, wherein a parity section of the destination storage block comprises a parity row for each logical page stored within multi-level cells of the destination storage block.

20. The apparatus of claim 15, wherein the XOR parity data within the parity section of the destination storage block is configured according to a parity bin map configured to enable recovery of a logical page of a data section of the destination storage block in response to a read error of the logical page, and recovery of a physical page in response to a word line to word line short within a single plane.

* * * * *